(12) United States Patent
Moraru et al.

(10) Patent No.: US 12,292,510 B2
(45) Date of Patent: May 6, 2025

(54) VEHICLE MIRROR ASSEMBLY WITH A MOVABLE SENSOR

(71) Applicant: HERE Global B.V., Eindhoven (NL)

(72) Inventors: Ion Moraru, Chicago, IL (US); John McKearin, Berwyn, IL (US)

(73) Assignee: HERE GLOBAL B.V., Eindhoven (NL)

(*) Notice: Subject to any disclaimer, the term of this patent is extended or adjusted under 35 U.S.C. 154(b) by 217 days.

(21) Appl. No.: 17/966,495

(22) Filed: Oct. 14, 2022

(65) Prior Publication Data

US 2024/0125939 A1     Apr. 18, 2024

(51) Int. Cl.
   *G01S 17/931*   (2020.01)
   *B60R 1/12*     (2006.01)
   *G01C 21/34*    (2006.01)
   *G01S 7/481*    (2006.01)

(52) U.S. Cl.
   CPC .............. *G01S 17/931* (2020.01); *B60R 1/12* (2013.01); *G01C 21/34* (2013.01); *G01S 7/4813* (2013.01); *B60R 2001/1223* (2013.01); *B60R 2001/1253* (2013.01)

(58) Field of Classification Search
   CPC ..... G01S 17/931; G01S 7/4813; G01C 21/34; B60R 1/12; B60R 2001/1223; B60R 2001/1253
   See application file for complete search history.

(56) References Cited

U.S. PATENT DOCUMENTS

| | | | |
|---|---|---|---|
| 6,954,152 B1* | 10/2005 | Matthews | B60R 1/25 |
| | | | 348/148 |
| 8,718,877 B1* | 5/2014 | Englander | B60R 1/0612 |
| | | | 359/872 |
| 10,126,422 B1* | 11/2018 | Obodo | G01S 13/56 |
| 10,421,401 B1* | 9/2019 | Horian | B60R 11/04 |
| 2014/0037138 A1* | 2/2014 | Sato | G06V 20/58 |
| | | | 382/103 |
| 2016/0176371 A1* | 6/2016 | Coleman | B60R 1/025 |
| | | | 701/49 |
| 2017/0101058 A1* | 4/2017 | Park | B60R 1/081 |

(Continued)

FOREIGN PATENT DOCUMENTS

| | | | | |
|---|---|---|---|---|
| DE | 10249685 A1 * | 5/2004 | | B60Q 1/2665 |
| EP | 3109095 A1 * | 12/2016 | | B60Q 1/08 |

(Continued)

OTHER PUBLICATIONS

Lin et al., "Dynamic multi-vehicle detection and tracking from a moving platform", Published in: 2013 IEEE Conference on Computer Vision and Pattern Recognition Workshops, Sep. 12, 2013, pp. 781-787.

*Primary Examiner* — Babar Sarwar

(57) ABSTRACT

A vehicle mirror assembly is provided. The vehicle mirror assembly, for example, includes a housing attachable to a vehicle. The vehicle mirror assembly also includes a reflective surface coupled to the housing or covering an opening in the housing. The vehicle mirror assembly further includes a movable sensor coupled to the housing or contained in a space formed by the housing and reflective surface. The vehicle mirror assembly further includes an actuator assembly configured to modify an orientation, a position, or a combination thereof of the movable sensor in response to a control signal.

19 Claims, 13 Drawing Sheets

(56) References Cited

U.S. PATENT DOCUMENTS

| | | | |
|---|---|---|---|
| 2017/0210297 A1* | 7/2017 | Kim | G01S 17/931 |
| 2017/0225628 A1 | 8/2017 | Aich et al. | |
| 2017/0320491 A1* | 11/2017 | Teller | B60W 30/00 |
| 2018/0290594 A1* | 10/2018 | Abdel-Rahman | B60R 1/06 |
| 2018/0304817 A1* | 10/2018 | Englander | B60R 1/083 |
| 2020/0031278 A1* | 1/2020 | Zafeirakis | H04N 7/18 |
| 2020/0156592 A1* | 5/2020 | Zaharia | B60R 25/104 |
| 2020/0174469 A1* | 6/2020 | Trumpore | B64U 80/86 |
| 2020/0346581 A1* | 11/2020 | Lawson | B60R 1/0612 |
| 2020/0384924 A1* | 12/2020 | Broghammer | B60R 1/12 |
| 2021/0129753 A1* | 5/2021 | Hendricks | H04N 7/183 |
| 2021/0129797 A1* | 5/2021 | Zaharia | B60R 25/20 |
| 2021/0250553 A1* | 8/2021 | Naber, Jr. | B60R 25/302 |
| 2022/0161726 A1* | 5/2022 | Choi | B60R 1/12 |

FOREIGN PATENT DOCUMENTS

| | | | | |
|---|---|---|---|---|
| JP | 2008120280 A | | 5/2008 | |
| KR | 1702888 B1 * | | 2/2017 | B60R 1/00 |
| WO | WO-2020182439 A1 * | | 9/2020 | B60R 1/06 |

\* cited by examiner

VEHICLE MIRROR ASSEMBLY WITH A MOVABLE SENSOR

BACKGROUND

Modern vehicles (e.g., autonomous, semi-autonomous, or high-assisted vehicles) are equipped with a growing array of intricate sensors and other equipment. These sensors, for example, can provide for increased situational awareness to enhance safety, facilitate autonomous or semi-autonomous operation, and provide other functions. However, deployment of these sensors on vehicles traditionally has been limited (e.g., because of sensor fragility, complexity, costs, etc.). Accordingly, service providers and manufacturers face significant technical challenges with respect to achieving increased sensor coverage on vehicles.

SOME EXAMPLE EMBODIMENTS

Therefore, there is a need for deploying vehicle sensors efficiently and in way that protects the sensors from damage, e.g., by incorporating one or more sensors into a vehicle mirror assembly.

According to one embodiment, a vehicle mirror assembly comprises a housing attachable to a vehicle (e.g., as a side mirror of the vehicle). The vehicle mirror assembly also comprises a reflective surface (e.g., a mirror) coupled to the housing or covering an opening in a space formed by the housing and the reflective surface. The vehicle mirror assembly further comprises a movable sensor coupled to the housing or contained in a space formed by the housing and the reflective surface. The vehicle mirror assembly further comprises an actuator assembly configured to modify an orientation, a position, or a combination thereof of the movable sensor in response to a control signal.

According to one embodiment, a computer-implemented method of controlling a vehicle mirror assembly comprises determining a location of a vehicle, a location of an object of interest, navigation information, map information, an orientation of a reflective surface of the vehicle mirror assembly, or a combination thereof. The method also comprises generating a control signal to modify an orientation, a position, or a combination thereof of a movable sensor of the vehicle mirror assembly based on the location of the vehicle, the location of the object of interest, the navigation information, the map information, the orientation of the reflective surface, or a combination thereof. The method further comprises providing the control signal to an actuator assembly of the vehicle mirror assembly. The actuator assembly is configured to modify the orientation, the position, or a combination thereof of a movable sensor based on the control signal.

According to another embodiment, an apparatus comprises at least one processor, and at least one memory including computer program code for one or more computer programs, the at least one memory and the computer program code configured to, with the at least one processor, cause, at least in part, the apparatus to determine a location of a vehicle, a location of an object of interest, navigation information, map information, an orientation of a reflective surface of the vehicle mirror assembly, or a combination thereof. The apparatus is also caused to generate a control signal to modify an orientation, a position, or a combination thereof of a movable sensor of the vehicle mirror assembly based on the location of the vehicle, the location of the object of interest, the navigation information, the map information, the orientation of the reflective surface, or a combination thereof. The apparatus is further caused to provide the control signal to an actuator assembly of the vehicle mirror assembly. The actuator assembly is configured to modify the orientation, the position, or a combination thereof of a movable sensor based on the control signal.

According to another embodiment, a computer-readable storage medium carries one or more sequences of one or more instructions which, when executed by one or more processors, cause, at least in part, an apparatus to determine a location of a vehicle, a location of an object of interest, navigation information, map information, an orientation of a reflective surface of the vehicle mirror assembly, or a combination thereof. The apparatus is also caused to generate a control signal to modify an orientation, a position, or a combination thereof of a movable sensor of the vehicle mirror assembly based on the location of the vehicle, the location of the object of interest, the navigation information, the map information, the orientation of the reflective surface, or a combination thereof. The apparatus is further caused to provide the control signal to an actuator assembly of the vehicle mirror assembly. The actuator assembly is configured to modify the orientation, the position, or a combination thereof of a movable sensor based on the control signal.

According to another embodiment, an apparatus comprises means for determining a location of a vehicle, a location of an object of interest, navigation information, map information, an orientation of a reflective surface of the vehicle mirror assembly, or a combination thereof. The apparatus also comprises means for generating a control signal to modify an orientation, a position, or a combination thereof of a movable sensor of the vehicle mirror assembly based on the location of the vehicle, the location of the object of interest, the navigation information, the map information, the orientation of the reflective surface, or a combination thereof. The apparatus further comprises means for providing the control signal to an actuator assembly of the vehicle mirror assembly. The actuator assembly is configured to modify the orientation, the position, or a combination thereof of a movable sensor based on the control signal.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

Embodments described herein refer to sensors associated with a vehicle. It is contemplated that embodiments of the invention also apply to other equipment components associated with a vehicle. Such other equipment components may include communications hardware, such as antennae or arrays, data ports, display ports, vehicle tags, displays, lighting, mirrors, tires, windshield wipers, brakes, windshield washers and the like.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of an apparatus, method, and computer program for providing a vehicle mirror assembly with movable sensor are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
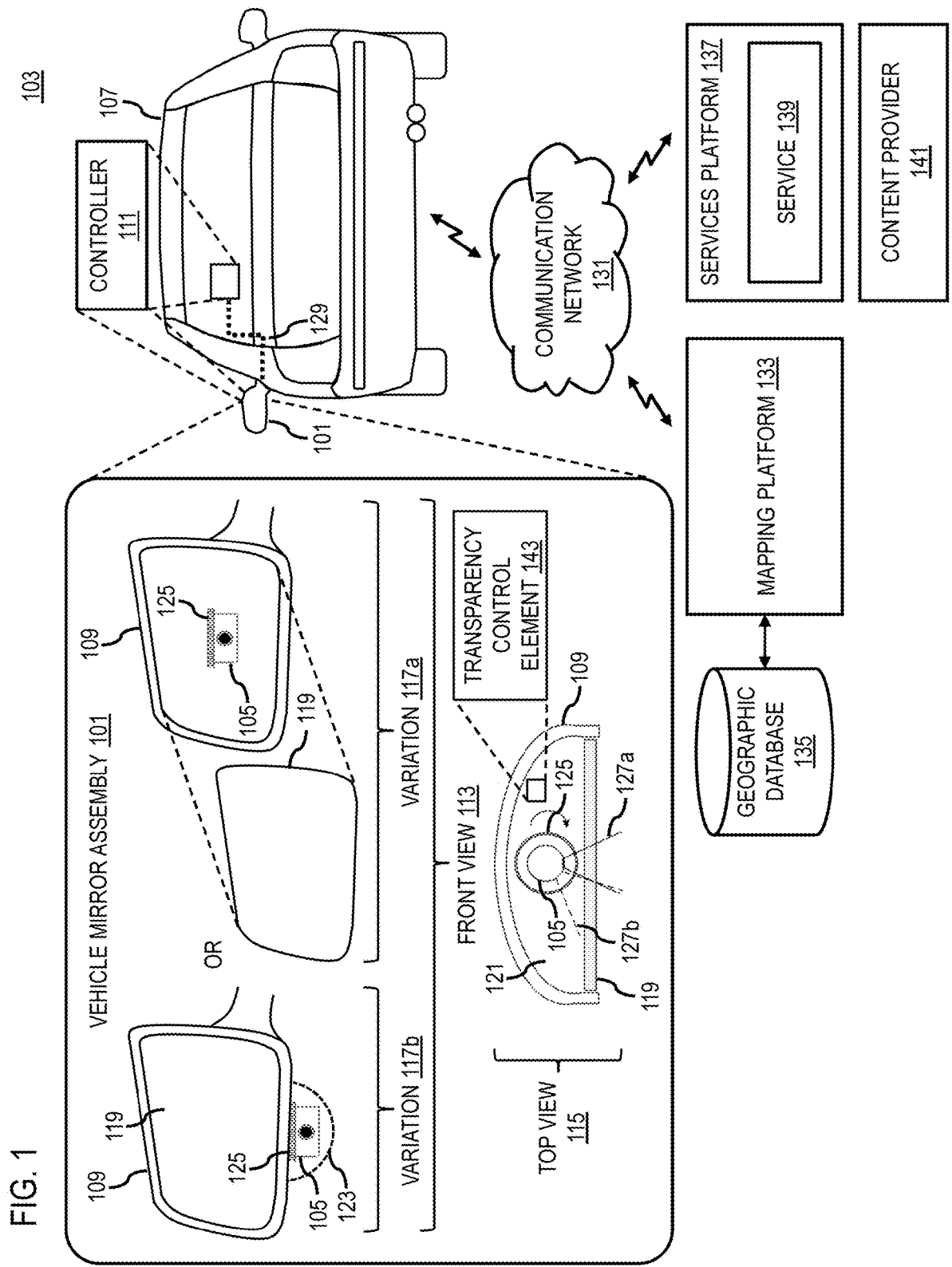
FIG. 1 is a diagram of a vehicle mirror assembly and system capable of controlling a movable sensor of the vehicle mirror assembly, according to one example embodiment.

FIG. 1 is a diagram of a vehicle mirror assembly 101 and system 103 capable of controlling a movable sensor 105 of the vehicle mirror assembly 101, according to one example embodiment. The inability to see objects, road features, etc. around a vehicle 107 in traffic presents tremendous risks for drivers, and the public. For example, drivers nowadays often use cameras (or other equivalent sensor) to enhance their visibility around a vehicle 107. Yet, most cameras are installed around the vehicle exterior (e.g., in the rear of the vehicle 107), where they can be subject to damage/dirt from dust and debris from the road. Also, cameras generally are fixed in their position, which can leave visibility gaps, especially while traveling. For example, traditional vehicles generally come equipped with rigidly oriented rear and/or front-facing cameras, proximity sensors, and/or other sensors (e.g., LiDAR, radar, etc.), thereby creating visibility or sensor field of view coverage gaps to the sides of the vehicles. Such gaps can present high risks, particularly for autonomous driving applications. Although more cameras/sensors can be used to fill the gaps, the use of additional sensors could have an impact on cost, space, and/or resources of the vehicle. Accordingly, vehicle service providers and manufacturers face significant technical challenges with respect to extending the sensor coverage around vehicles 107 without increasing space, resource, or cost requirements.

To address these technical challenges, the vehicle mirror assembly 101 introduces a capability to incorporate a movable sensor 105 that increases sensor coverage to advantageously reduce visibility gaps. In one embodiment, unlike traditional technologies that use fixed cameras or sensor, each vehicle mirror assembly 101 implements one or more movable sensors 105, which allows for the capture of different fields of view/sensing. In some embodiments, each vehicle mirror assembly 101 is configured to wholly encapsulate one or more sensors 105 (e.g., camera, proximity sensor, etc.), which provides security, protection from damage, and optimized operation. For example, the inclusion of sensor(s) 105 in the assembly housing 109, in particular, prevents premature sensor damage from the elements, obstructions from dust and debris, and also reduces the risk of theft.

In some embodiments, the vehicle mirror assembly 101 looks to reduce the risks associated with manual/autonomous driving. The ability to move the sensors 105 enhances safety by increasing the field of view of the sensors 105. In one embodiment, the vehicle mirror assembly 101 (e.g., via a controller 111) moves or orients the movable sensor 105 to provide optimal visibility or sensor coverage depending on various factors (e.g., location, traffic, time of day, proximity to objects, proximity to road features, etc.). This also has the advantageous effect of reducing vehicle costs and/or vehicle resources (e.g., processing resources, memory, bandwidth, etc. resources) by eliminating the need for more sensors, complex sensor data processing (e.g., field of view transformations), or more sophisticated sensors (e.g., wide-angle cameras). In other words, a single movable sensor 105 of the vehicle mirror assembly 101 can provide the equivalent field of view or sensor coverage as multiple traditional fixed sensors.

FIG. 1 illustrates in part a vehicle mirror assembly from a front view 113 and a top view 115 with the top view 115 having a first variation 117a and a second variation 117b (the variations 117a and 117b are described in more detail further below). As shown in FIG. 1, in one embodiment, the vehicle mirror assembly 101 may include:

a housing 109 attachable to a vehicle 107;
  a reflective surface 119 coupled to/covering an opening in the housing 109;
  a movable sensor 105 contained inside a space 121 formed by the housing 109 and reflective surface 119 (e.g., variation 117a) or attached externally to the housing 109 with an optional cover 123 (e.g., variation 117b);
  an actuator assembly 125 configured to modify an orientation/position of the movable sensor 105 in response to control signals (e.g., sent from controller 111); and
  a transparency control element 143 configured to selectively control the opacity/transparency of the housing 109 and/or reflective surface 119 by application of voltage, heat, light, etc. depending on the material of the housing 109 and/or reflective surface 119 to enable signals emitted or measured by the movable sensor 105 to pass through.

In one embodiment, the reflective surface 119 can be partially or semi-transparent, or a one-way mirror such that light or other target signal wavelengths can pass through the reflective surface 119 (e.g., from and/or to the movable sensor 105 mounted in the space 121 of the vehicle mirror assembly 101). The reflective surface 119 may include a reflective coating (e.g. a metallic coating). In other embodiments, the reflective surface 119 may include a layer/coating whose opacity/transparency can be controlled by voltage (e.g., electrochromic), heat (e.g., thermochromic), or light (e.g., photochromic). By way of example, the layer/coating can include but is not limited to: (1) electrochromic devices such as electrochromic glass that changes its opacity in response to voltage; (2) polymer-dispersed liquid-crystal devices in which liquid crystals are randomly dispersed into a polymer such that the polymer appears translucent or more opaque and then appears transparent when a voltage is applied to align the liquid crystals in the polymer; (3) suspended-particle devices in which nano-particles are suspended in a liquid between or otherwise attached to glass or plastic such that when no voltage is applied the nano-particles are arranged randomly to block light and when voltage is applied the nano-particles align to let light pass to achieve transparency; (4) micro-blinds which are composed of rolled thin metal blinds (e.g., transparent when rolled) that unroll in response to voltage to become more opaque; and (5) thermoplastics made of materials whose refractive index (and thus transparency/opacity) changes based on voltage, heat, or light. It is noted that examples above are provided by way of illustration and not as limitations. It is contemplated that any material, film, or coating whose transparency to signals of the movable sensor 105 can be used according to the various embodiments described herein.

In one embodiment, the housing 109 of the vehicle mirror assembly 101 in its entirety (or a portion of it) can be completely opaque. In other embodiments, the housing 109 can include or be made of a material whose opacity/transparency can be controlled by voltage, heat, or light (e.g., similar to materials discussed with respect to embodiments of the reflective surface 119 described above). The material, for instance, may depend on the movable sensor 105 and the type of signals emitted and/or measured. For example, if the movable sensor 105 is a camera, then the material would be transparent to visible light. If the movable sensor 105 is a LiDAR sensor, then the material would be transparent to the wavelength of the laser light used by the sensor, and so on. In one embodiment, the selective opacity/transparency of the housing 109 allows for the movable sensor 105 to have a forward-looking view through the housing 109 in addition to the rear-facing view through the reflective surface 119, thereby advantageously extending the viewing range of the movable sensor 105. That is, the movable sensor 105 may be rotated in plane up through a full range of motion depending on sensor configuration (e.g., 180 degrees, 360 degrees, etc.) capturing forward, side, rear views, and/or any other views in between. Also, in some embodiments, the selective opacity/transparency of the housing 109 and one-way mirror of the reflective surface 119 keeps the movable sensor 105 hidden from view (e.g., resulting in less chances of theft), but allowing the movable sensor 105 to operate when in use.

In one embodiment, the housing 109 can include telemetry hardware for communicating with the controller 111. The telemetry hardware, for instance, can then relay signals from the controller 111 (e.g., signals comprising or otherwise including instructions) to other components of the vehicle mirror assembly 101 including but not limited to the movable sensor 105 (e.g., to initiate capturing sensor data), actuator assembly 125 (e.g., to modify the orientation and/or position of the movable sensor 105), housing 109 (e.g., to change opacity/transparency), and reflective surface 119 (e.g., to change opacity/transparency). In one embodiment, the housing 109 can include other openings (e.g., for electrical wiring/harness, mounting points to the vehicle 107, etc.).

In one embodiment, the movable sensor 105 can be any type of sensor that can be equipped or configured on or to the vehicle 107. Examples of the movable sensor 105 include but are not limited to a camera, radar sensor, proximity sensor, optical sensor, etc. In one embodiment, the movable sensor 105 can be displaced from or mechanically coupled to the reflective surface 119. In either case, the movable sensor 105 can be configured to either move with the movement/orientation of the reflective surface 119 or move independently from the a movement/orientation of the reflective surface 119.

The movable sensor 105 can also be mounted within the space 121 created by the housing and the reflective surface 119 (e.g., referred to as internal to the housing 109) as illustrated in variation 117a of the vehicle mirror assembly 101. In other embodiments, the movable sensor 105 can be mounted external to the housing 109 as illustrated in variation 117b of the vehicle mirror assembly 101. Although the movable sensor 105 is illustrated as being mounted to the bottom the housing 109, it is contemplated that the movable sensor 105 can be externally mounted to the housing 109 at any location including but not limited to the top, side, back, etc. If mounted externally, the movable sensor 105 can be further protected by an optional cover 123. In one embodiment, the optional cover 123 can be made of a material that is selectively transparent or opaque to the signals emitted or measured by the movable sensor 105. Examples of the material are discussed above with respect to the material of the housing 109 and reflective surface 119.

In one embodiment, the actuator assembly 125 can include but is not limited to various gears (e.g. linear, helical, worm, bevel, spur, herringbone, hypoid, etc.) that can operate to move or orient the movable sensor 105. More specifically, the actuator assembly 125 can be mechanically coupled to the movable sensor 105 and configured to move/orient the movable sensor 105 in various directions or orientations. For example, the movement or orientation of the movable sensor 105 can result in the change of a first field of view 127a (e.g., sensor coverage area) to a second field of view 127b of the movable sensor 105. This change from the first field of view 127a to the second field of view 127b advantageously enables the movable sensor 105 to provide a greater sensor coverage area compared to an equivalent fixed or non-movable sensor. Although the movable sensor 105 is shown to rotate in a single plane, it may also be configured to orient out of plane along any axis of movement.

In one embodiment, the actuator assembly 125 can also control the movement and/or orientation of the reflective surface 119. It is noted that although the actuator assembly 125 is discussed with respect to providing movement or orientation of the movable sensor 105 using gears, it is contemplated that any equivalent assembly configured to move or orient the movable sensor 105 can be used whether or not the assembly includes gears for performing the movement or orientation. Examples of non-gear assemblies include but are not limited to pistons, belts, push rods, etc.

In one embodiment, the controller 111 can control the actuator assembly 125 to result in moving or orienting the movable sensor 105 of the vehicle mirror assembly 101. For example, the controller can generate, transmit, and/or receive various signals/data (e.g., control signals for sensor movement, images, and/or other data) related to operating the vehicle mirror assembly 101 and/or any of its components (e.g., actuator assembly 125, movable sensor 105, housing 109, and/or reflective surface 119) according to the various embodiments described herein. The controller 111, for instance, can control housing opacity/transparency, and include the structures, hardware, circuitry, software, firmware, etc. to perform its functions.

In one embodiment, as shown in FIG. 1, the controller 111 can be incorporated into the housing 109 or external to the housing (e.g., within vehicle 107 and communicatively coupled to one or more vehicle mirror assemblies 101 equipped on the vehicle 101 via a wired or wireless connection 129). In cases where the vehicle 101 includes multiple vehicle mirror assemblies 101 (e.g., respective vehicle mirror assemblies 101 on the driver's and passenger's sides of the vehicles 101), each vehicle mirror assembly 101 can be associated with its own controller 111 or one controller 111 can be configured to operate the multiple vehicle mirror assemblies 101. In some embodiments, the controller 111 can communicate with various hardware equipped in or otherwise associated with the vehicle 107 or a driver/passenger of the vehicle 107 (e.g. navigation system, heads-up display, mobile device, etc.). In addition, the controller 111 can communicate over a communication network 131 to mapping platform 133 with a geographic database 135 (e.g., storing map information, route information, etc.). In addition or alternatively, the controller 111 can have a local instance of all or a portion of the geographic database 135. In one embodiment, the controller 111 also has connectivity over the communication network 131 to a services platform 137 including one or more services 139 as well as connectivity to a content provider 141. The services platform 137, services 139, and/or content provider 141 can provide services, applications, and/or data that the controller 111 can use to generate control signals to the vehicle mirror assembly 101.

As described above, in various embodiments, the opacity/transparency of the reflective surface 119 and/or housing 109 may be selectively controlled for all or a portion of the reflective surface 119 and/or housing 109. In addition, the controller 111 can change the orientation/position of the movable sensor 105 and/or reflective surface 119 based on vehicle location, target object location, navigation, road information (e.g., straight, curve, hill, etc.), map information (e.g. POIs), etc. In one embodiment, the opacity/transparency and/or orientation/position can be controlled based on where the field of view of the movable sensor 105 should be directed.

In some embodiments, a vehicle mirror assembly 101 can include multiple movable sensors 105. For example, in addition to a first movable sensor 105, the vehicle mirror assembly 101 further comprises at least one other movable sensor 105 coupled to the housing 109 or contained in the space 121 formed by the housing 109 and the reflective surface 119. Then, the opacity or transparency of respective portions of the housing 109 and/or reflective surface 119 can be selectively controlled based on the orientation, position, and/or field of view of the respective sensors 105. For example, in one embodiment, the vehicle mirror assembly 101 can include two cameras (i.e., two movable sensors 105) to provide for stereoscopic vision by working in tandem to generate a three-dimensional image. In this embodiment, different areas of the housing 109 and/or reflective surface 119 can be made transparent so that each camera can have an unobstructed field of view to the outside of the vehicle mirror assembly 101. It is noted that the dual stereoscopic camera use case described above is provided by way of illustration and not as a limitation. It is contemplated that the vehicle mirror assembly 101 can have any number or types of movable sensors 105 that work in tandem or independently of each other to capture sensor data and provide situational awareness.

Figure 2:
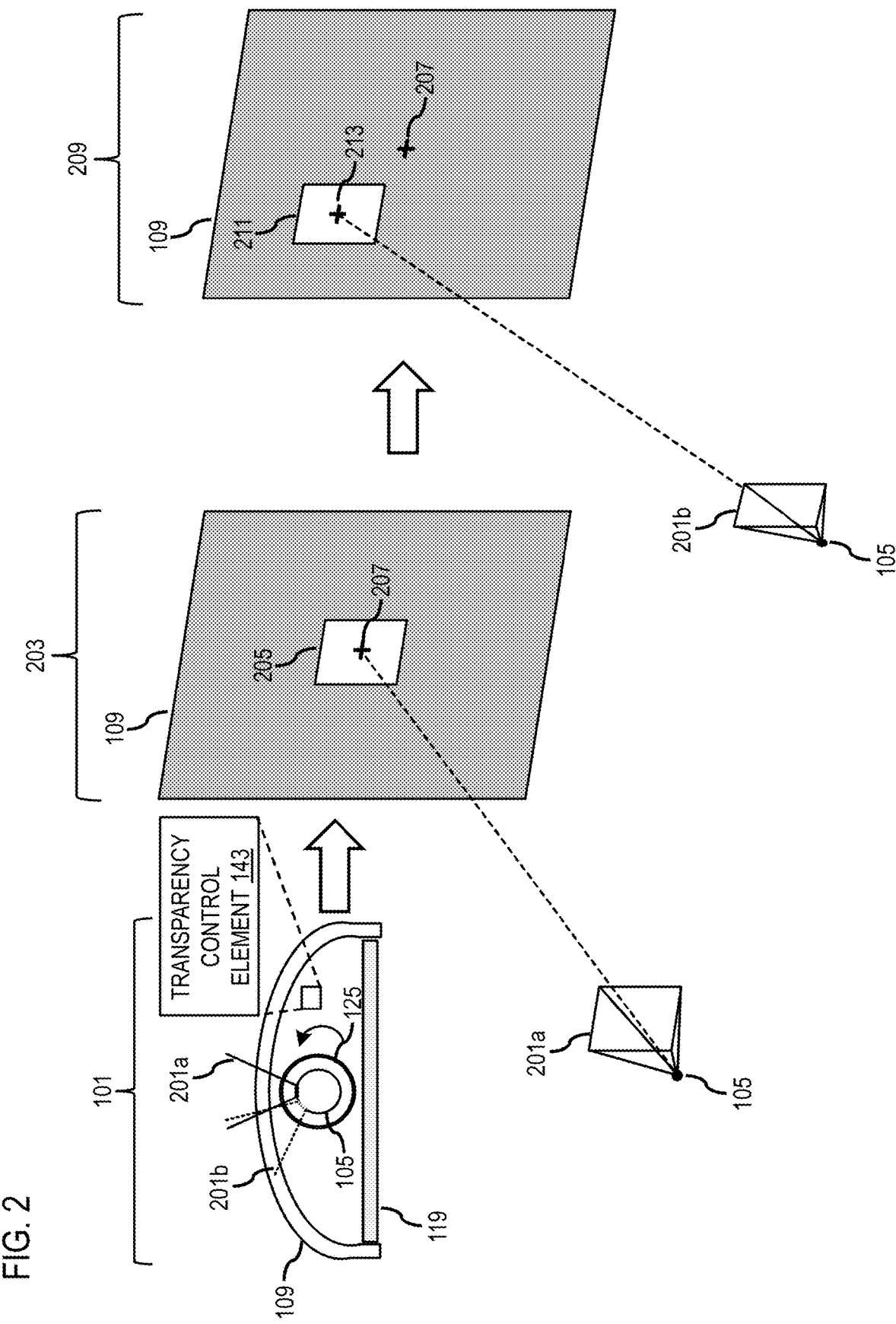
FIG. 2 is a diagram illustrating an example of controlling an opacity of a vehicle mirror assembly housing based on a field of view of a movable sensor, according to one example embodiment.

FIG. 2 is a diagram illustrating an example of controlling an opacity of a vehicle mirror assembly housing 109 based on a field of view of a movable sensor 105, according to one example embodiment. As shown, the vehicle mirror assembly 101 includes the movable sensor 105 configured to move or change orientations via the actuator assembly 125. In an initial state, the movable sensor 105 is oriented to the face the rear of the vehicle mirror assembly 101 such that the initial field of view 201a is forward through the housing 109. The housing 109 is made of a material for which selectable portions of the housing 109 can be made transparent to the movable sensor 105 (e.g., via the transparency control element 143). For example, if the movable sensor 105 is a camera, the housing 109 is opaque to visible light and can then be made transparent to visible light. In other words, the material of the housing 109 is initially opaque to the movable sensor 105 and can be activated (e.g., via an applied voltage, heat, or light initiated by the transparency control element 143) to become transparent to the movable sensor 105.

If the movable sensor 105 is forward facing (as in the case of field of view 201a that is also represented in scenario 203), opacity of the housing 109 can be selectively controlled. That is, a portion 205 of the housing 109 can be made transparent by locally applying heat, light, or voltage (e.g. using grid-like electrical structures/leads embedded or attached to the housing interior or body). In one embodiment, as shown under scenario 203, the portion 205 can be determined (e.g., by the controller 111) based on a point 207 projected from the a position of the movable sensor 105 through the center of the field of view 201a to the surface of the housing 109. The grid or portion 205 corresponding to the point 207 can be selected to make transparent so that the movable sensor 105 can "see" through that portion 205. Such selective transparency/opacity advantageously reduces glare, optical interference, etc.

Under scenario 209, the movable sensor 105 is reoriented to view a new field of view 201b that is to the left and top of the original field of view 201a. In this case, the controller 111 can determine a new portion 211 of the housing 109 to make transparent. This new portion 211, for instance, is determined by projecting a point 213 from the position of the movable sensor 105 through the center of the field of view 201b to the surface of the housing 109. Heat, light, or voltage is applied to the new portion 211 to make it transparent. In addition, heat, light, or voltage is removed from the previous portion 205 to make it opaque. In this way, as the field of view of the movable sensor 105 moves around through the housing 109, selective portions of the housing is made transparent to provide a clear line of sight for the movable sensor 105. The size of portion 205 or portion 211 may vary, depending upon the movable sensor 105 capabilities, as well as the distance between the movable sensor 105 and the housing 109.

Although not shown in the example of FIG. 2, if the movable sensor 105 faces forward (e.g., looking through the reflective surface 119 of the vehicle mirror assembly 101), light, heat, or voltage can be applied to a material or portion thereof coating or included in the reflective surface 119 to make the reflective surface 119 or portion thereof transparent to the movable sensor 105. The opacity of the optional cover 123 may also be controlled in the same way.

In one embodiment, the vehicle mirror assembly 101 in combination with the system 103 can be used to improve the safety of vehicle operation via the use of movable sensors 105. As discussed in more detail in the various embodiments below, various aspects of the vehicle mirror assembly 101 and system 103 can be used to control the movement or orientation of the movable sensor 105 of the vehicle mirror assembly 101 based on vehicle location on a road, position of an object of interest around the vehicle, and/or other similar factors.

Figure 3:
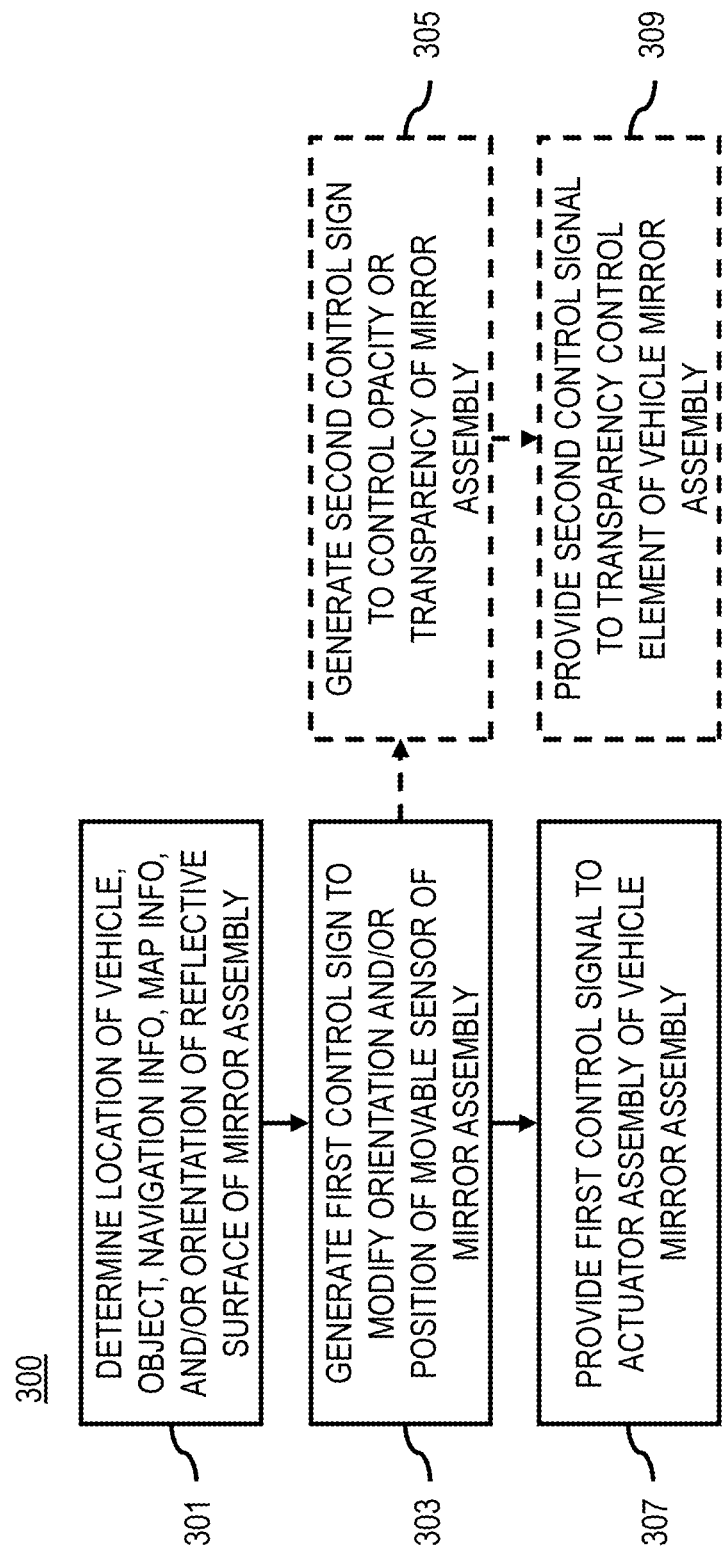
FIG. 3 is a flowchart of a process for controlling a vehicle mirror assembly with a movable sensor, according to one example embodiment.
Figure 12:
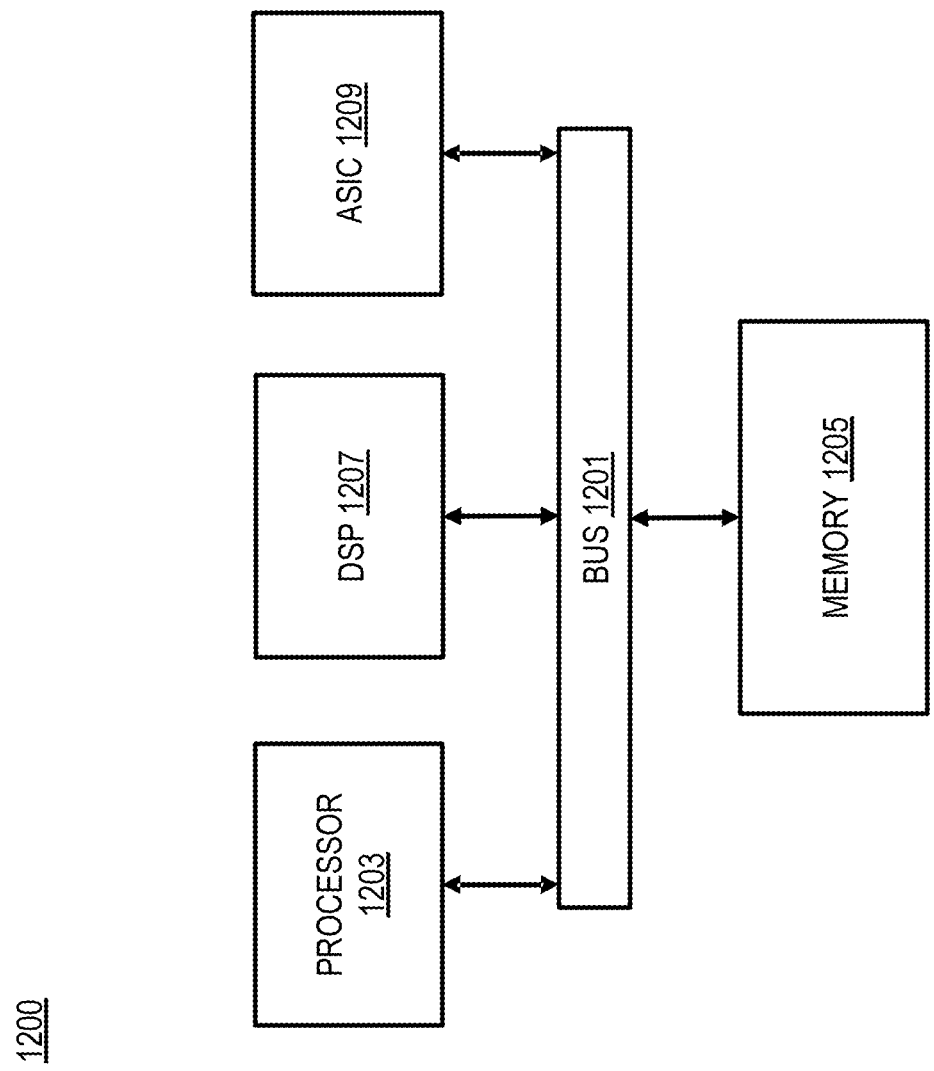
FIG. 12 is a diagram of a chip set that can be used to implement an embodiment.

FIG. 3 is a flowchart of a process 300 for controlling a vehicle mirror assembly 101 with a movable sensor 105, according to one example embodiment. In various embodiments, the controller 111 alone or in combination with the mapping platform 133, geographic database 135, services platform 137, services 139, and/or content provider 141 may perform one or more portions of the process 300 and may be implemented in, for instance, a chip set including a processor and a memory as shown in FIG. 12 and/or other circuitry for performing one or more steps of the process 300. As such, the controller 111 can provide means for accomplishing various parts of the process 300, as well as means for accomplishing embodiments of other processes described herein in conjunction with other components of the system 103. Although the process 300 is illustrated and described as a sequence of steps, its contemplated that various embodiments of the process 300 may be performed in any order or combination and need not include all of the illustrated steps.

In step 301, the controller 111 determines a location of a vehicle 107, a location of an object of interest, navigation information, map information, an orientation of a reflective surface 119 of the vehicle mirror assembly 101, or a combination thereof. For example, the parameters can be determined as follows:

Location of vehicle 107 to which the vehicle mirror assembly 101 is attached (e.g., as a side mirror) can be determined using a Global Navigation Satellite System (GNSS) (e.g., GPS, GLONASS, etc.), radar, proximity, image processing and/or any other equivalent localization techniques;

Location of one or more objects of interest can be determined using image processing of geotagged image data (e.g., captured from the movable sensor 105 or any other sensor of the vehicle 107, nearby vehicles, infrastructure sensors, etc.), visual odometry, and/or other equivalent techniques;

Navigation information indicating a navigation route planned for the vehicle 107 via an onboard navigation system, the mapping platform 133, or equivalent navigation routing engine;

Map information indicating map features (such as but not limited to road networks, road features, road attributes, terrain features, etc.) can be determined from the geographic database 135 (e.g., using a local instance or cloud-based instance via the mapping platform 133); and An orientation of the reflective surface 119 can be determined from the telemetry hardware of the vehicle mirror assembly 101 or equivalent.

In step 303, the controller 111 generates a first control signal to modify an orientation, a position, or a combination thereof of a movable sensor of the vehicle mirror assembly 101 based on the location of the vehicle, the location of the object of interest, the navigation information, the map information, the orientation of the reflective surface, or a combination thereof. In embodiments in which the opacity/transparency of the housing 109 and/or reflective surface 119 of the vehicle mirror assembly 101 can be selectively controlled, the controller 111 can also generate a second control signal to activate a transparency of at least a portion of the housing 109 and/or reflective 119 to enable signals measured or emitted by the movable sensor 105 to pass through (optional step 305). The second control signal, for instance, can be used to selectively make the housing 109 and/or reflective surface 119 transparent in coordination with the first control signal to move/orient the movable 105 or in coordination with the activation of the movable 105 to begin capturing sensor data. In some embodiments, the housing 109 and/or reflective surface 119 can be made transparent as in their entirety (e.g., as a single unit). In alternate embodiments, the selected portions of the housing 109 and/or reflective surface 119 can be selectively made transparent. For example, the second control signal may include or target a specific x-y position or elements on a grid to make transparent as described with respect to the various embodiments of FIG. 2 above.

In one embodiment, the first control signal and/or second control signal can be determined based on any one or more of the following:

Based on a location of the vehicle 107—e.g., can be used to determine or anticipate viewing or sensor coverage needs (e.g., a curved road might require different camera field of view compared to a straight road). Then depending on the anticipated viewing or sensor coverage, one or more portions of the housing 109 and/or reflective surface 119 can be made transparent so that the sensor field of view is not obstructed by the housing 109 and/or reflective surface 119.

Based on a location of one or more objects of interest—e.g., an object such as another vehicle that is changing lanes might become invisible to the vehicle 107's cameras or other sensor, and therefore would require a camera orientation adjustment. In some cases, the position and movement of the object(s) can be tracked/anticipated using the movable sensor 105 to avoid loss of visibility. Then, in embodiments supporting selective transparency, one or more portions of the housing 109 and/or reflective surface 119 can be made transparent so that the sensor field of view is not obstructed by the housing 109 and/or reflective surface 119.

Based on navigation information—e.g., a movement or sequence of movements of the sensors may be determined once a route has been entered into or calculated by a navigation system. Each sensor movement would be activated upon reaching a specific location. This may include analyzing the route, and determining locations where sensors need adjustment. In other words, the controller 111 determines a navigation route for the vehicle 107 and then determines a sequence of fields of view of the movable sensor associated with respective locations on the navigation route. The first control signal is generated based on the sequence of fields of view as the vehicle travels the navigation route. In embodiments supporting selective transparency, the controller 111 can coordinate the sequence of movements of the movable sensor 105 with a sequence of transparency activations of the housing 109 and/or reflective surface 119 (e.g., when the movement sequence calls for the movable sensor 105 to be forward facing through the housing 109). In this way, the controller 111 can also (pre)determine a sequence of transparency activations of the housing 109 and/or reflective 119 in coordination with sensor movements. In some embodiments, a navigational route may be modified enroute based on, for instance, updated traffic, weather, construction, destination change, etc. In such cases, the sequence of sensor movements and/or sequence of transparency activations of the housing 109 and/or reflective surface 119 may also be modified.

Based on map information (e.g., POIs, traffic, road attributes, time of day, weather etc.) and traffic—e.g., different locations, different traffic conditions, or different times of day may require different fields of view because of different road geometries, different objects/vehicles/pedestrians present, driver fatigue, rain, snow, fog, etc. In one embodiment, the map information may also keep a record of locations where accidents or other abnormal events have occurred before and allow for the system to maintain a clear view of the location using the vehicle mirror assembly 101. Examples of other abnormal events include but are not limited to locations of previously observed debris, construction, potholes, pedestrian crossing, etc. In other words, the controller determines a proximity of the vehicle 107 to a geographic area of interest, geotagged events, and/or other map features. The control signal is then generated to modify the orientation, the position, or a combination thereof and to direct a field of view of the movable sensor based on the geographic area of interest, geotagged events, map features, etc.

Based on an orientation of a reflective surface 119 (e.g., a mirror) of a vehicle mirror assembly 101—e.g., sensor movement may be locked to or made to diverge from the reflective surface 119's position or movement.

In step 307, the controller 111 provides the first control signal (e.g., for controlling sensor movement) to an actuator assembly 125 of the vehicle mirror assembly 101. The actuator assembly configured to modify the orientation, the position, or a combination thereof of a movable sensor based on the control signal. In one embodiment, the control signal may specify a direction, field of view, angle, etc. to move or orient the movable sensor 105 along with signals to alter the opacity/transparency of the housing 109 and/or reflective surface 119 of the vehicle mirror assembly 101 that blocks or otherwise interferes with the movable sensor 105's being able to emit or measure signals from the specified direction, field of view, angle, etc.

In embodiments that support selective transparency, the controller 111 provides the second control signal (e.g., for transparency activation) to a transparency control element 143 (or equivalent component) of the vehicle mirror assembly 101. As described in the embodiments above, the second control signal can specify all or a portion housing 109 and/or reflective surface 119 to make transparent to the signals emitted or measured by the movable sensor 105. The second control signal, for instance, can specify the target x-y position or elements on a grid corresponding to the portion of the housing 109 and/or reflective surface 119 to make transparent. The transparency control element 143 can then cause an application of voltage, heat, light, etc. to be applied to the specified portion of the housing 109 and/or reflective surface 119 to activate transparency (optional step 309).

In one embodiment, in addition or as an alternate to any of the steps of the illustrated embodiment of the process 300, the controller 111 and/or system 103 may be configured to execute various other steps including but not limited to:

- Detecting object(s) of interest using the movable sensor(s) 105 by processing the sensor data (e.g., processing the image data) captured by the sensor 105 or any other sensor of the vehicle 107;
- Tracking/predicting movement of the object(s) of interest by analyzing the sensor data captured by the movable sensor 105 and/or any other sensor of the vehicle 107 (e.g. using image processing, machine learning, etc.);
- Providing an alert based on the detection or movement of the object(s) of interest, and in some aspects, the alert may indicate a loss of object visibility, and/or reaching the maximal movement range for the movable sensors 105;
- Activating one or more safety features;
- Automatically adjusting the position and/or direction of the vehicle 107 (e.g., if the vehicle 107 is an autonomous vehicle) or presenting information in a user interface for adjusting the position and/or direction of the vehicle 107 (e.g., if the vehicle 107 is manual vehicle or otherwise operating in manual mode) to track and restore object visibility;
- Accessing live map information (e.g., from the geographic database 135) to obtain real-time or the most current map data; and/or
- Projecting/showing sensor data and other information onto a display (e.g., a vehicle display or mobile device associated with a driver or passenger of the vehicle 107).

FIGS. 4-7 illustrate example use cases of controlling a vehicle mirror assembly 101 with a movable sensor 105, according to various example embodiments.

Figure 4:
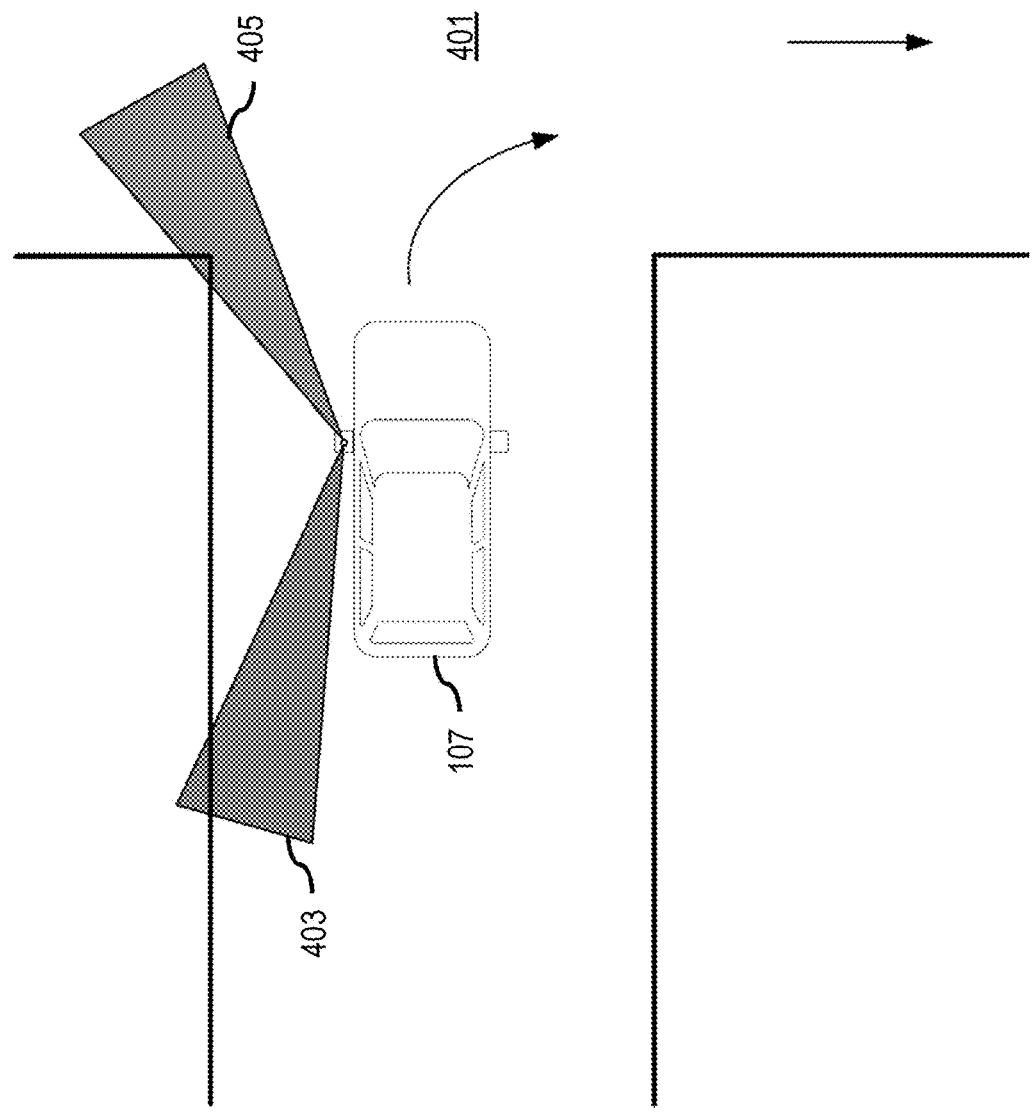
FIG. 4 is a diagram illustrating an example use case of using a vehicle mirror assembly with a movable sensor at an intersection, according to one example embodiment.

For example, FIG. 4 is a diagram illustrating an example use case of using a vehicle mirror assembly 101 with a movable sensor 105 at an intersection, according to one example embodiment. In one embodiment, a vehicle 107 includes a movable image sensor 105 that is attached to the driver's side mirror assembly 101. As shown in FIG. 4, the vehicle 107 may be approaching an intersection 401. In this example, the controller 111 may generate control signals that are executed so that the movable image sensor 105 moves into a position that enables the movable image sensor 105 to capture data as the vehicle 107 approaches the intersection 401. As shown, the movable sensor 105 may be in a first orientation associated with a field of view 403. As the vehicle 107 approaches the intersection 401, the movable sensor 105 is moved to a second orientation associated with a field of view 405. In one embodiment, the controller 111 and/or other components of the system 103 may be configured to analyze the captured sensor data (e.g., image processing, object detection and tracking, etc.). Based on the analysis of the sensor data, the controller 111 and/or other components of the system 103 can determine a level of risk associated with turning at the intersection 401. In one embodiment, a representation of the determined level of risk can be presented in user interface of a device associated with the vehicle 107 and/or driver/passenger of the vehicle 107.

Figure 5:
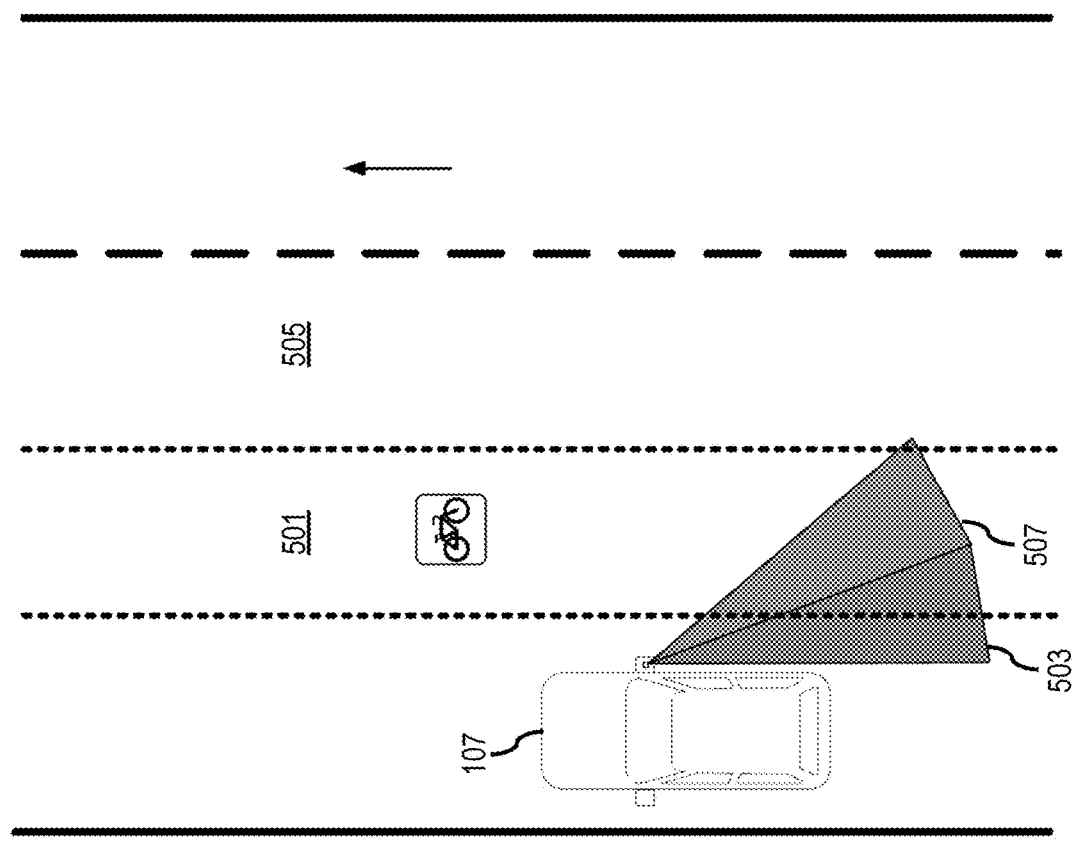
FIG. 5 is a diagram illustrating an example use case of using a vehicle mirror assembly with a movable sensor near a bicycle lane, according to one example embodiment.

FIG. 5 is a diagram illustrating an example use case of using a vehicle mirror assembly 101 with a movable sensor 105 near a bicycle lane 501, according to one example embodiment. As shown, a vehicle 107 may be parked next to a bicycle lane 501. While the vehicle 107 is in the parked position, the movable sensor 105 may be in a first orientation associated with a field of view 503. As the vehicle 107 prepares to move towards the first lane 505, the controller 111 or other component of the system 103 may determine the intended path of the vehicle 107 (e.g., the rotation of the steering wheel, the position of the wheels, etc.) and generate a control signal to move the movable sensor 105 to a second orientation corresponding to the field of view 507 to capture data based on the intended path of the vehicle 107. In some aspects, other information may be used to determine the second field of view 507, including but not limited to traffic information, map information, etc. (e.g., queried from the geographic database 135).

Figure 6:
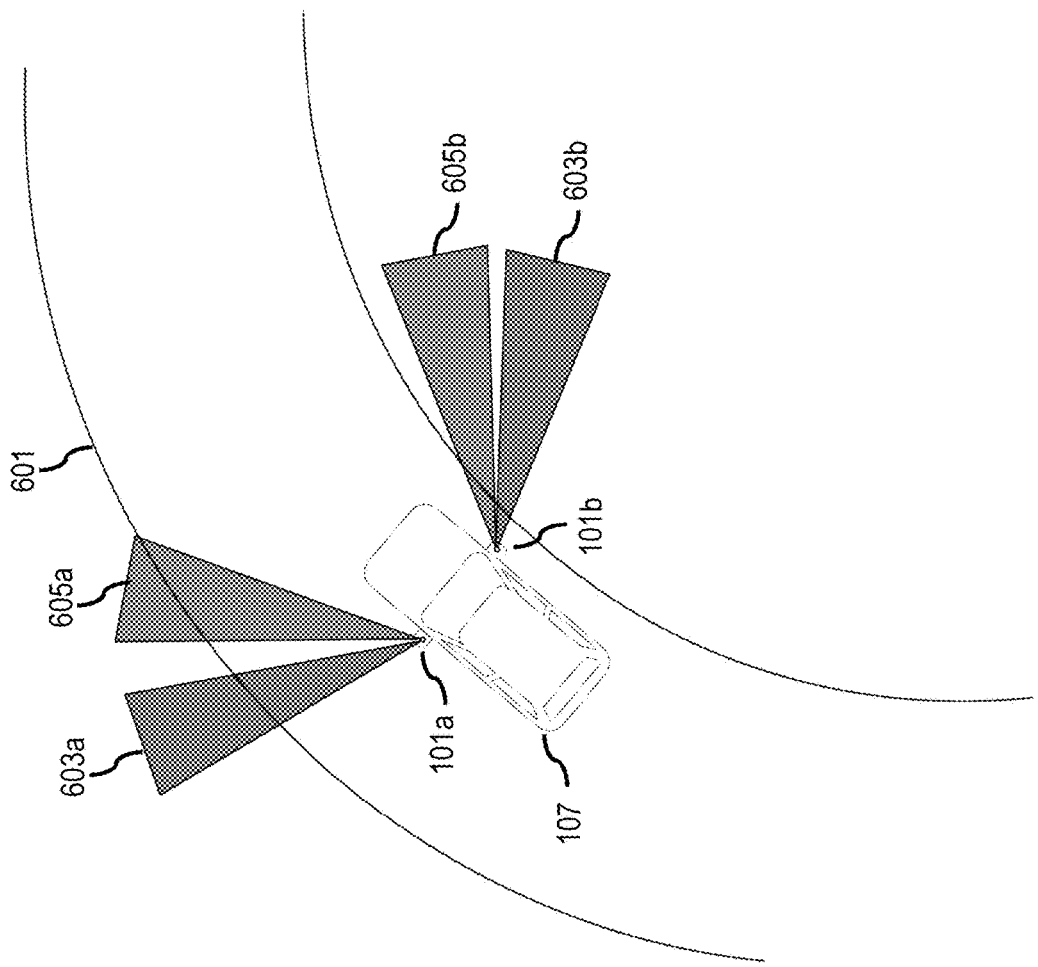
FIG. 6 is a diagram illustrating an example use case of using a vehicle mirror assembly with a movable sensor on a curved road, according to one example embodiment.

FIG. 6 is a diagram illustrating an example use case of using vehicle mirror assemblies 101a and 101b each with one or more movable sensors 105 on a curved road segment 601, according to one example embodiment. As shown, a vehicle 107 is equipped with a driver's side vehicle mirror assembly 101a and a passenger's side vehicle mirror assembly 101b and is traveling along a curved road segment 601. In this example, the controller 111 and/or other component of the system 103 can analyze the curvature of the road 601 and determine where to move the movable sensors 105 of the respective vehicle mirror assemblies 101a and 101b to capture visibility gaps associated with the vehicle 107 as the vehicle 107 moves along the road segment 601. The movable sensor of driver's side vehicle mirror assembly 101a may be in a first orientation associated with a field of view 603a, and the movable sensor of the passenger's side vehicle mirror assembly 101b may be in a first orientation associated with a field of view 603b. As the vehicle 107 prepares to travel along the road segment 601, the controller 111 and/or other component of the system 103 may generate control signals to move the movable sensors of the driver's side vehicle mirror assembly 101a and the passenger's side vehicle mirror assembly 101b to respective second orientations corresponding to the fields of view 605a and 605b to capture data. In one embodiment, the movement of the sensors of the driver's side vehicle mirror assembly 101a and passenger's side vehicle mirror assembly 101b may be coordinated, e.g., to determine depth or proximity of objects when looking ahead of the vehicle 107. Alternatively, the movement of the sensors of the driver's side vehicle mirror assembly 101a and passenger's side vehicle mirror assembly 101b may also be determined independently. In some embodiments, the transparency of the housings 109 and/or reflective surfaces 119 of the vehicle mirror assemblies 101a and 101b can be controlled in coordination with the sensor movements and/or sensor activations.

Figure 7:
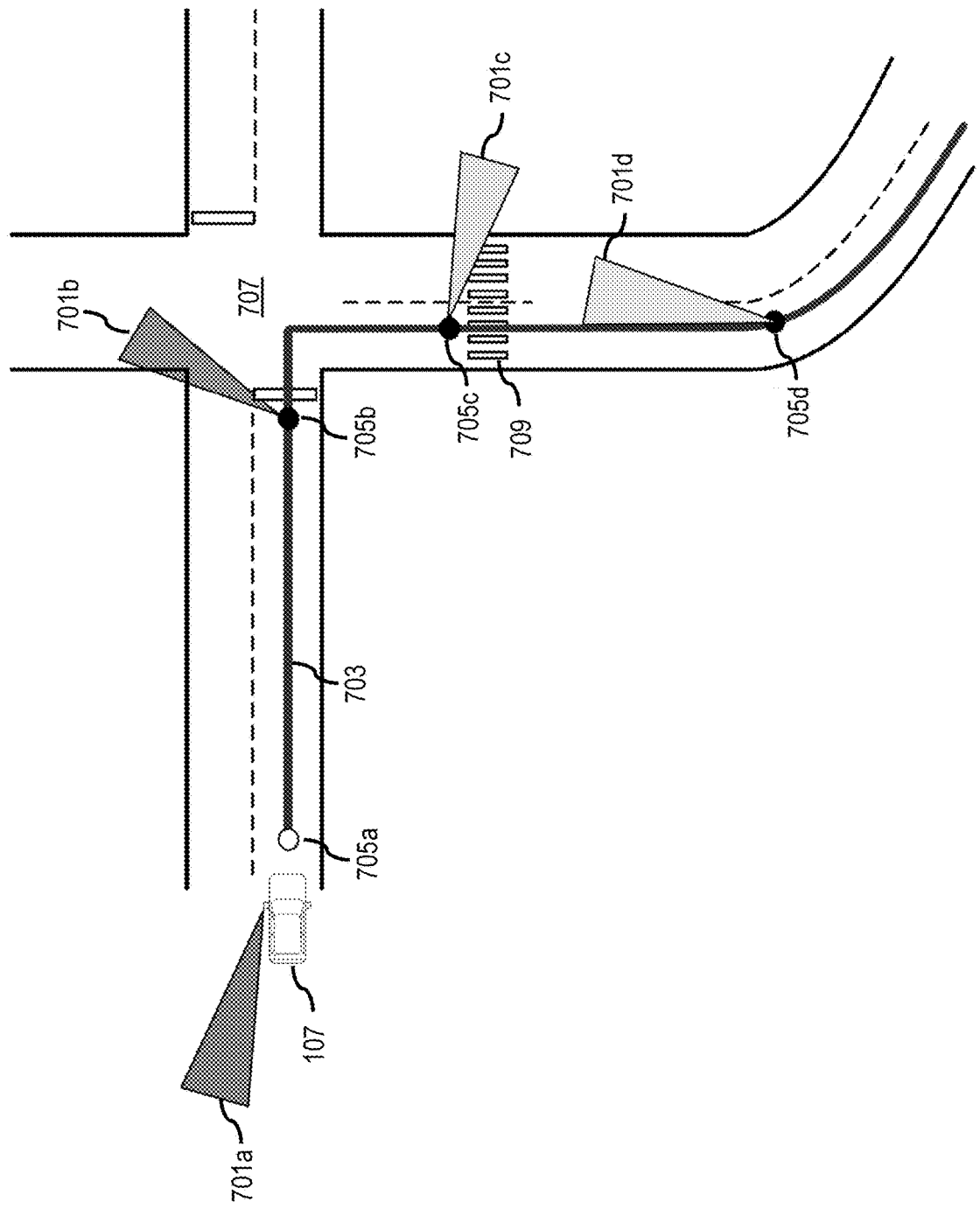
FIG. 7 is a diagram illustrating an example use case of determining a sequence of fields of view of a movable sensor of a vehicle mirror assembly, according to one example embodiment.

FIG. 7 is a diagram illustrating an example use case of determining a sequence of fields of view 701a-701d of a movable sensor 105 of a vehicle mirror assembly 101, according to one example embodiment. In the example of FIG. 7, the controller 111 and/or other components of the system 103 may be configured to determine, based on a navigational route 703 to be traveled by a vehicle 107, a sequence of desirable fields of view 701a-701d (at respective specific locations 705a-705d) for a movable sensor 105 of a vehicle mirror assembly 101 attached to vehicle 107. Upon arrival at each of the locations 705a-705d, the controller 111 may then execute controls signals to adjust the movable sensor 105 to the predetermined field of view (e.g., respective fields of view 701a-701d) and/or to activate transparency of the housing 109 and/or reflective surface 119 of the vehicle mirror assembly 101. As described, these locations 705a-705d may be associated with specific changes in travel or road direction, as well as other factors (e.g., presence of pedestrians, traffic, crosswalks, etc.). To this end, the system may access a variety of information, including traffic information, map/road information, weather/time information, probe information, etc., when computing the sequence of desirable fields of view 701a-701d.

For example, at location 705a of the navigation route 703, the vehicle 107 is traveling on a straight road segment (e.g., determined from map information of the geographic database 135), and the movable sensor 105 can be oriented to have a field of view 701a directed to a blind spot to the left rear of the vehicle 107. As the vehicle 107 approaches an intersection 707 at location 705b of the navigation route 703, the movable sensor 105 can be oriented to have a field of view 701b in the direction of oncoming traffic on the cross street (e.g., determined from map and traffic information of the geographic database 135). The vehicle 107 then approaches a crosswalk 709 at location 705c (e.g., determined from map information of the geographic database 135), the movable sensor 105 can be oriented to have a field of view 701c in the direction where pedestrians are likely to cross at the crosswalk 709 (e.g., determined by pedestrian traffic and map information of the geographic database 135). As the vehicle 107 approaches location 705d and clears the crosswalk 709, the movable sensor 105 can be reoriented to its default position that has a field of view 701d to the left rear of the vehicle 107. In some embodiments, the sequence of fields of view 701a-701d may be dynamically adjusted while on the navigation route 703 based on estimated arrival time/delay to each point, changes in circumstances (e.g., weather, traffic, rerouting etc.) determined from, for instance, traffic information, map/road information, weather/time information, probe information, etc.

Figure 8:
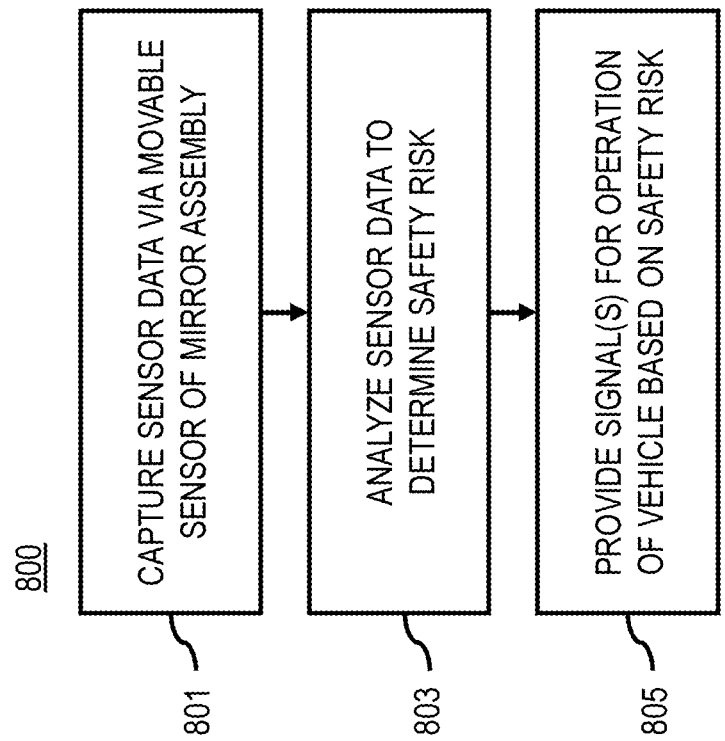
FIG. 8 is a flowchart of a process for using sensor data from a movable sensor of a vehicle mirror assembly to operate a vehicle, according to one example embodiment.

FIG. 8 is a flowchart of a process 800 for using sensor data from a movable sensor 105 of a vehicle mirror assembly 101 to operate a vehicle 107, according to one example embodiment. In various embodiments, the controller 111 alone or in combination with the mapping platform 133, geographic database 135, services platform 137, services 139, and/or content provider 141 may perform one or more portions of the process 800 and may be implemented in, for instance, a chip set including a processor and a memory as shown in FIG. 12 and/or other circuitry for performing one or more steps of the process 800. As such, the controller 111 can provide means for accomplishing various parts of the process 800, as well as means for accomplishing embodiments of other processes described herein in conjunction with other components of the system 103. Although the process 800 is illustrated and described as a sequence of steps, its contemplated that various embodiments of the process 800 may be performed in any order or combination and need not include all of the illustrated steps.

A system 103 for improving the safety of vehicle operation is described with respect to the various embodiments of the process 800. In one embodiment, the system 103 comprises the movable sensor 105 of the vehicle mirror assembly 101, the controller 111, and the geographic database 135.

In step 801, the system 103 is configured to capture sensor data via one or more movable sensors 105 coupled to a vehicle 107 (e.g., as part of the vehicle mirror assembly 101 attached to vehicle 107 such as a side mirror of the vehicle 107). The sensor data, for instance, is captured based on movement/orientation of the movable sensors 105 as described in the various embodiments with respect to FIGS. 3-7 above. For example, as discussed with respect to the various embodiments described herein, the system 103, for instance, can carry out one or more methods with the appropriate hardware for generating control signals for the movable sensor(s) 105 using the controller 111; and then transmitting the control signals to an actuator assembly 125 that effectuates/controls movements of the movable sensors 105. It is contemplated that the sensor data can be of any type (e.g., based on the specific movable sensor 105 being used). Examples of sensor data include but are not limited to image data, LiDAR scans, radar scans, object proximity information, audio data, etc.

In step 803, the system 103 is configured to analyze the sensor data and determine a risk assessment based on the analysis. By way of example, analysis of the sensor can include but is not limited to image processing and/or computer vision technique (e.g., or other equivalent data processing or machine learning-based techniques based on the sensor data type) to detect objects or other map features and/or related attributes (e.g., speed, location, heading, size, proximity, etc. of the detected object or feature). The risk assessment can then be based on determining whether there is a risk or probability of colliding with the detected object, damaging detected property, or otherwise compromising the safety of the vehicle 107, other nearby vehicles, pedestrians, or other road users. In one embodiment, the driver's side and passenger's side vehicle mirror assemblies 101 can also be operated in tandem to allow for stereo/depth perception to facilitate the risk assessment. In addition or alternatively, each vehicle mirror assembly 101 can include a multiple camera sensors that work in tandem to provide stereoscopic vision without having to coordinate the fields of view of driver's side and passenger's side vehicle mirror assemblies 101.

In step 805, the system 103 provides one or more signals for operation of the vehicle 107 based on the determined risk assessment. For example, if the system determines that there is a high likelihood of colliding with another vehicle, then the system may activate one or more safety features (e.g., braking, changing operating mode, preparing for an impact, etc.). In on embodiment, the risk assessment can represent the estimated risk level as a probability, percentage, or any other equivalent risk metric. If the risk level is greater than the risk threshold, the system 103 can send one or more operation signals to the vehicle 107. The signals can be used by the vehicle 107 or other associated device (e.g., embedded device or device associated with a driver/passenger of the vehicle 107) to present a notification of the risk and/or provide guidance information (e.g., a new navigation route to avoid or mitigate the risk).

In embodiments where the vehicle 107 supports autonomous or semi-autonomous mode of operation, the signals can include instructions for the vehicle 107 to take evasive maneuvers, initiate one of the safety features described above, etc. without intervention from the driver or passenger. In some cases, the vehicle 107 can use the signals from the system 103 to determine the mode of operation (e.g., autonomous mode, semi-autonomous mode, or manual mode) of the vehicle 107 based on the risk level estimated from the sensor data 105 of the movable sensor 105 of the vehicle mirror assembly 101. It is contemplated that the vehicle 107 can support any number of autonomous driving modes. The vehicle 107, for instance, can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHT SA") defines six levels of vehicle automation:

Level 0 (No-Automation)—"Zero autonomy; the driver performs all driving tasks.";

Level 1 (Driver Assistance)—"Vehicle is controlled by the driver, but some driving assist features may be included in the vehicle design.";

Level 2 (Partial Automation)—"Vehicle has combined automated functions, like acceleration and steering, but the driver must remain engaged with the driving task and monitor the environment at all times.";

Level 3 (Conditional Automation)—"Driver is a necessity, but is not required to monitor the environment. The driver must be ready to take control of the vehicle at all times with notice.";

Level 4 (High Automation)—"The vehicle is capable of performing all driving functions under certain conditions. The driver may have the option to control the vehicle."; and Level 5 (Full Automation)—"The vehicle is capable of performing all driving functions under all conditions. The driver may have the option to control the vehicle."

The various embodiments described herein are applicable to vehicles that are classified in any of the levels of automation (levels 0-5) discussed above.

Figure 9:
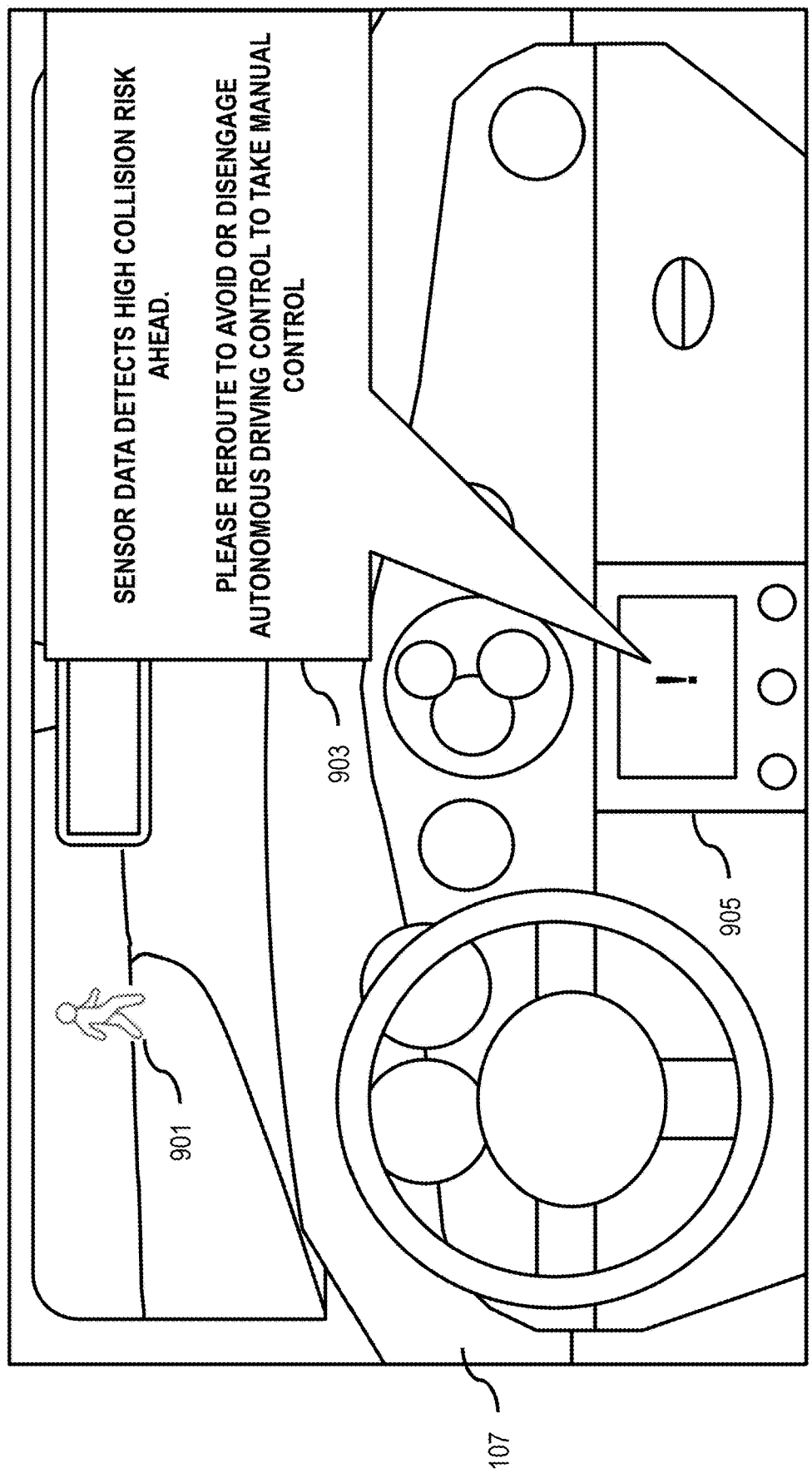
FIG. 9 is a diagram of an example user interface for operating a vehicle based on sensor data captured by a movable sensor of a vehicle mirror assembly, according to one example embodiment.

FIG. 9 is a diagram of an example user interface for operating a vehicle 107 based on sensor data captured by a movable sensor 105 of a vehicle mirror assembly 101, according to one example embodiment. In the example of FIG. 9, an autonomous vehicle 107 is traveling on a curved road segment and has oriented its movable sensor 105 (e.g., a camera) to have a field of view directed forwards to the side of the road. The sensor data (e.g., image data) is analyzed using image processing/object detection, and a pedestrian 901 is detected on the side of the road moving toward the roadway at a speed that is predicted to collide with the vehicle 107 at a probably of 0.8. Because the risk probably is above a configured threshold value (e.g., threshold of 0.5), the controller 111 initiates the presentation of an alert message 903 on the vehicle 107's embedded display 905 indicating that "Sensor data detects high collision risk ahead. Please reroute to avoid or disengage autonomous driving mode to take manual control." In one embodiment, if there is no response from the driver or passenger, the autonomous vehicle 107 can automatically take action to avoid the collision (e.g., brake and safely move to stop on the shoulder of the road). In another embodiment, action to avoid the collision is taken immediately, and the user/driver of the autonomous vehicle 107 is notified simultaneously or afterwards via the user interface.

Returning to FIG. 1, in one embodiment, the controller 111 and/or mapping platform 133 have connectivity over the communication network 131 to the services platform 137 that provides one or more services 139. By way of example, the services 139 may be third-party services and include mapping services, navigation services, travel planning services, notification services, social networking services, content (e.g., audio, video, images, etc.) provisioning services, application services, storage services, contextual information determination services, location-based services, information-based services (e.g., weather, traffic, news, etc.), etc. In one embodiment, the services platform 137 uses the output of the sensor data collected by one or more movable sensors 105 of the vehicle mirror assembly 101 to provide services such as navigation, mapping, other location-based services, etc.

In one embodiment, the services platform 137 and/or mapping platform 133 may be a platform with multiple interconnected components and may include multiple servers, intelligent networking devices, computing devices, components, and corresponding software for providing a runaway vehicle detection system. In addition, it is noted that the services platform 137 and/or mapping platform 133 may be a separate entity of the system 103 or included within the local components of the vehicle 107 or controller 111.

In one embodiment, content providers 141 may provide content or data (e.g., including geographic data, sensor data, etc.) to the geographic database 135, the mapping platform 133, the services platform 137, the services 139, and/or the controller 111. The content provided may be any type of content, such as sensor data, map content, textual content, audio content, video content, image content, etc. In one embodiment, the content providers 141 may provide content that may aid in controlling the movement/orientation of the movable sensor 105 and/or using the sensor data collected by the movable sensor 105. In one embodiment, the content providers 141 may also store content associated with the geographic database 135, mapping platform 133, services platform 137, services 139, and/or controller 111. In another embodiment, the content providers 141 may manage access to a central repository of data, and offer a consistent, standard interface to data, such as a repository of the geographic database 135.

By way of example, the controller 111 can be any type of embedded system, processor, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. In one embodiment, the controller 111 may be associated with the vehicle mirror assembly 101 or vehicle 107, or be a component part of the vehicle mirror assembly 101 or vehicle 107.

In one embodiment, the vehicle mirror assembly 101 are configured with various movable sensors 105 for generating or collecting sensor data, related geographic/map data, etc. In one embodiment, the sensed data represent sensor data associated with a geographic location or coordinates at which the sensor data was collected. By way of example, the sensors may include a camera/image sensor, proximity sensors, a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, an audio recorder for gathering audio data, velocity sensors, and the like.

Other examples of movable sensors 105 of the vehicle mirror assembly 101 may include light sensors, orientation sensors augmented with height sensors and acceleration sensors (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, the movable sensors 105 may detect the relative distance of the vehicle from a physical divider, a lane or roadway, the presence of other vehicles, pedestrians, traffic lights, potholes and any other objects, or a combination thereof. In one scenario, the sensors 105 may detect weather data, traffic information, or a combination thereof. In one embodiment, the vehicle 107 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the vehicle can include equivalent sensors that are not movable and can be used in combination with the movable sensors 105 to determine risk and/or determine an optimal orientation or movement of the mobile sensors 105 according to various embodiments described herein.

In one embodiment, the communication network 131 of system 103 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), 5G New Radio, Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the controller 111, mapping platform 133, services platform 137, services 139, vehicle 107, and/or content providers 141 communicate with each other and other components of the system 103 using well known, new or still developing protocols. In this context, a protocol includes a set of rules defining how the network nodes within the communication network 131 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 10:
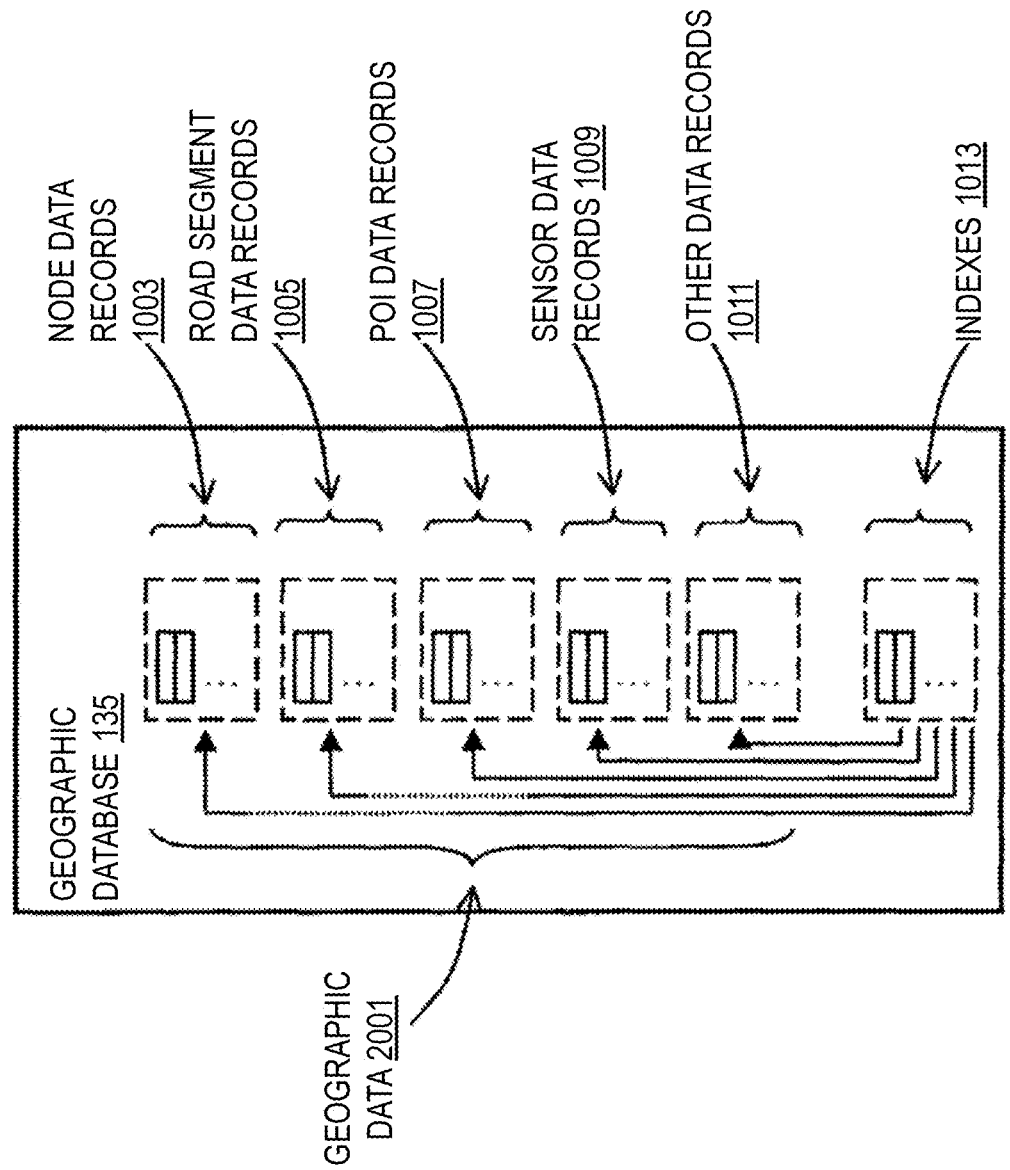
FIG. 10 is a diagram of a geographic database, according to one embodiment.

FIG. 10 is a diagram of a geographic database, according to one embodiment. In one embodiment, the geographic database 135 includes geographic data 1001 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 135.

"Node"— A point that terminates a link.

"Line segment"— A straight line connecting two points.

"Link" (or "edge")— A contiguous, non-branching string of one or more line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 135 follows certain conventions. For example, links do not cross themselves and do not cross each other except at a node. Also, there are no duplicated shape points, nodes, or links. Two links that connect each other have a common node. In the geographic database 135, overlapping geographic features are represented by overlapping polygons. When polygons overlap, the boundary of one polygon crosses the boundary of the other polygon. In the geographic database 135, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 135 includes node data records 1003, road segment or link data records 1005, POI data records 1007, sensor data records 1009, other records 1011, and indexes 1013, for example. More, fewer, or different data records can be provided. In one embodiment, additional data records (not shown) can include cartographic ("cartel") data records, routing data, and maneuver data. In one embodiment, the indexes 1013 may improve the speed of data retrieval operations in the geographic database 135. In one embodiment, the indexes 1013 may be used to quickly locate data without having to search every row in the geographic database 135 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 135 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, other road adjacent objects/features, etc. In one embodiment, the stored attributes or data can include two-dimensional and/or three-dimensional representations of object geometries corresponding to road adjacent object, buildings, features, etc. These object representations and their location data can be used by the system 103 to control one or more vehicle mirror assemblies 101 to keep the objects within the field of view of their respective movable sensors 105. For example, the stored object representations and locations can be used to compute a line of sight between the sensors 105 of the vehicle mirror assemblies 101 and the different objects (e.g., to determine sensor movements and/or transparency activations according to the various embodiments described herein). The geographic database 135 can include data about the POIs and their respective locations in the POI data records 1007. The geographic database 135 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city). In one embodiment, the geographic database 135 can also store the locations where incidents, accidents, and/or any other events that the system 103 can monitor and direct sensor movements and/or transparency activations towards.

In one embodiment, the geographic database 135 can also include sensor data records 1009 for storing the data used for determining the orientation/movement of the movable sensors 105, sensor data collected from the sensor data, risk assessment data resulting from the analysis of the sensor data, optimal orientation or sequences of orientations determine for a given road or map feature, and/or any other data used or generated by the controller 111, mapping platform 133, services platform 137, services 139, and/or content provider 141 according to the various embodiments described herein. In one embodiment, the sensor data records 1009 (e.g., data indicating an optimal movement or orientation of a movable sensor 105) can be associated with one or more of the node records 1003, road segment records 1005, and/or POI data records 1007; or portions thereof (e.g., smaller or different segments than indicated in the road segment records 1005, individual lanes of the road segments, etc.) to provide recommend orientations or fields of views for the movable sensor 105 at a given location.

In one embodiment, the geographic database 135 can be maintained by the content provider 141 in association with the mapping platform 133 (e.g., a map developer). The map developer can collect geographic data to generate and enhance the geographic database 135. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., runaway vehicle events, runaway vehicle safety locations, etc.) and/or record information about them, for example. Also, remote sensing, such as aerial or satellite photography, can be used.

In one embodiment, the geographic database 135 include high resolution or high definition (HD) mapping data that provide centimeter-level or better accuracy of map features. For example, the geographic database 135 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. In one embodiment, the HD mapping data can also include locations and two-dimensional and/or three-dimensional representations of objects that can be monitored by the movable sensors 105 of the vehicle mirror assemblies 101. As discussed above, the locations and representation enable the system 103 to compute line-of-sight data between sensors 105/vehicle mirror assemblies 101/vehicles 107 and the objects/map features of interest to control sensor movement and/or transparency activations of the housing 109 and/or reflective surface 119. By way of example, the HD mapping data also enable highly automated vehicles to precisely localize themselves on the road, and to determine road attributes (e.g., learned speed limit values) to at high accuracy levels.

In one embodiment, the geographic database 135 is stored as a hierarchical or multilevel tile-based projection or structure. More specifically, in one embodiment, the geographic database 135 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 103 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 135 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a vehicle mirror assembly 101 with a movable sensor 105 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 11:
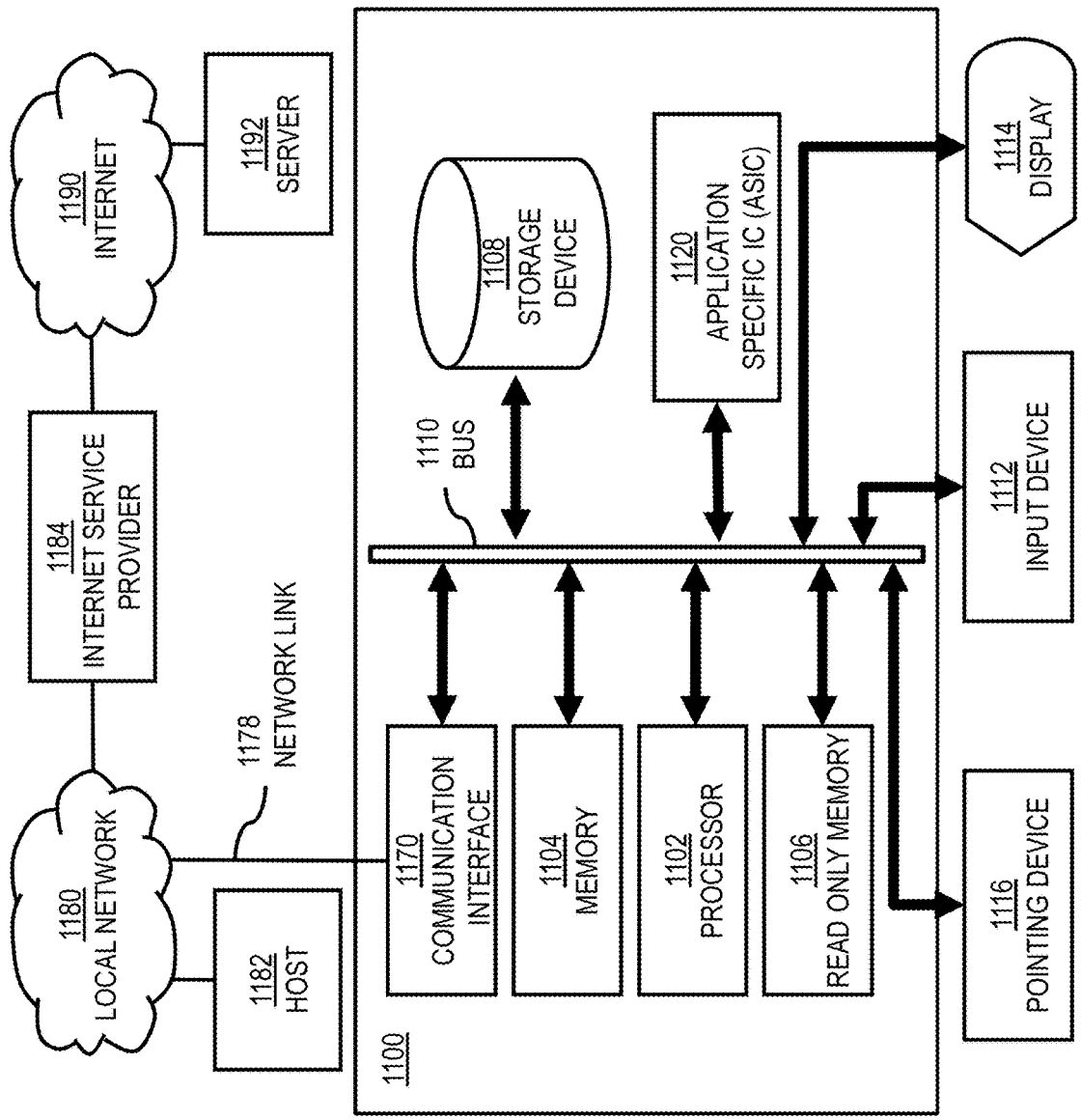
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide functions associated with a vehicle mirror assembly 101 with a movable sensor 105 as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing function associated with a vehicle mirror assembly 101 with a movable sensor 105. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing a vehicle mirror assembly 101 with a movable sensor 105. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk, or flash card, for storing information, including instructions, that persists even when the computer system 1100 is turned off or otherwise loses power.

Information, including instructions for providing a vehicle mirror assembly 101 with a movable sensor 105, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 131 for providing functions associated with a vehicle mirror assembly 101 with a movable sensor 105.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide functions associated with a vehicle mirror assembly 101 with a movable sensor 105 as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide functions associated with a vehicle mirror assembly 101 with a movable sensor 105. The memory 1205 also stores the data associated with or generated by the execution of the inventive steps.

Figure 13:
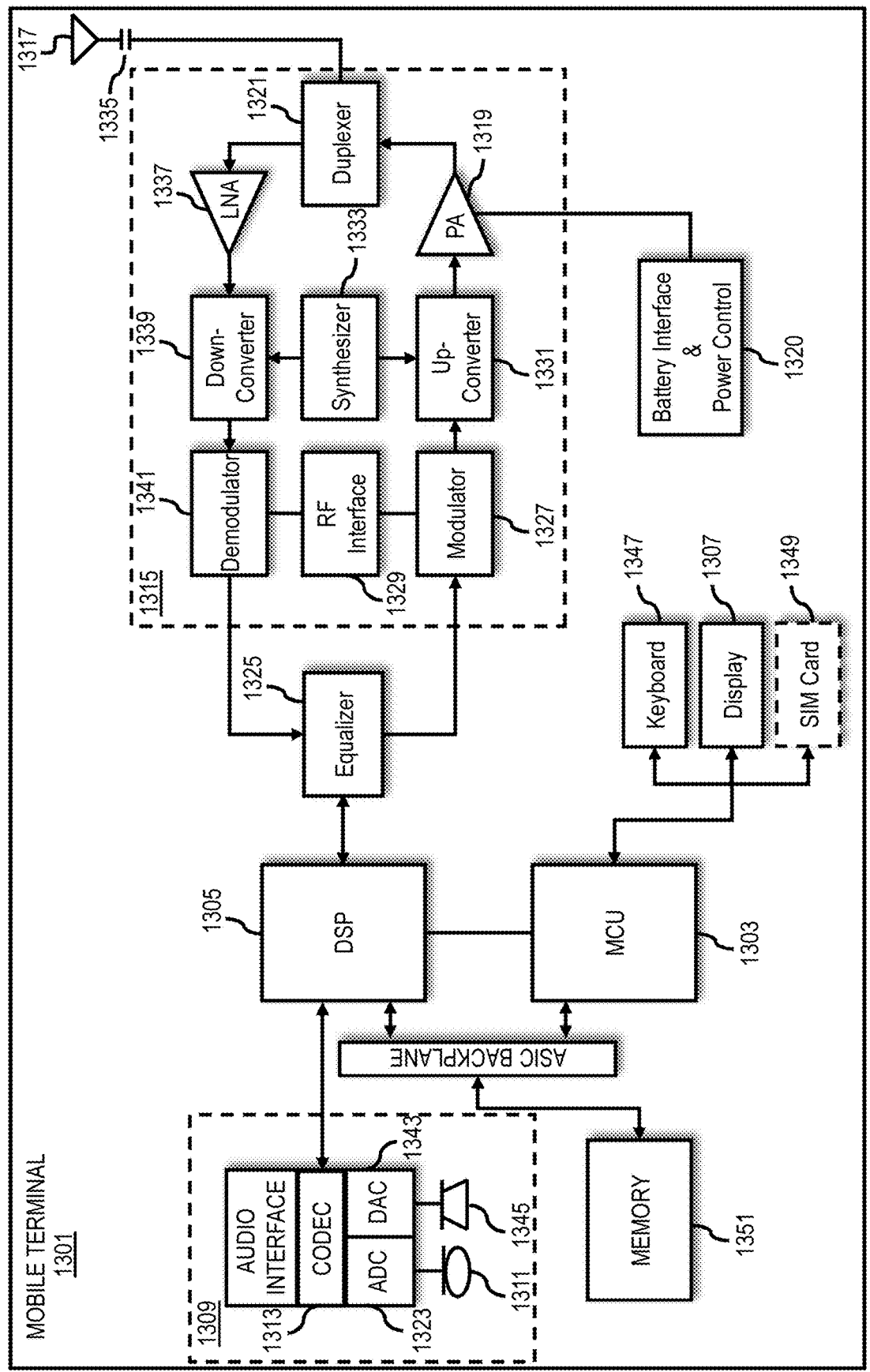
FIG. 13 is a diagram of a mobile terminal (e.g., handset or vehicle or part thereof) that can be used to implement an embodiment.

FIG. 13 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide functions associated with a vehicle mirror assembly 101 with a movable sensor 105. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A vehicle mirror assembly comprising:
 a housing attachable to a vehicle, wherein the housing includes a surface that is made of a first material with an adjustable opacity or transparency;
 a reflective surface coupled to the housing or covering an opening in the housing, wherein the reflective surface is made of a second material with an adjustable opacity or transparency;
 a movable sensor contained in a space formed by the housing and the reflective surface, wherein movement of the movable sensor is independent from movement of the reflective surface or the housing;
 an actuator assembly coupled to the movable sensor and configured to modify an orientation, a position, or a combination thereof of the movable sensor in response to a control signal; and
 a transparency control element configured to adjust (i) an opacity or transparency of the first material or (ii) an opacity or transparency of the second material based on a modification of at least one of the orientation and the position of the movable sensor in response to the control signal.

2. The vehicle mirror assembly of claim 1, further comprising:
 at least one other movable sensor coupled to the housing or contained in the space formed by the housing and the reflective surface,
 wherein the opacity or transparency of the material is selectively controlled in another portion of the housing, the reflective surface, or a combination thereof that is determined based on the at least one other movable sensor.

3. The vehicle mirror assembly of claim 1, wherein the opacity or the transparency of the first material or the second material is with respect to a signal that is emitted or measured by the movable sensor.

4. The vehicle mirror assembly of claim 1, wherein the vehicle mirror assembly is communicatively coupled to a controller, and wherein the controller is configured to generate the control signal.

5. The vehicle mirror assembly of claim 4, wherein the controller is further configured to determine a location of the vehicle, a location of an object of interest, navigation information, map information, an orientation of the reflective surface, or a combination thereof; and wherein the control signal is generated based on the location of the vehicle, the location of the object of interest, the navigation information, the map information, the orientation of the reflective surface, or a combination thereof.

6. The vehicle mirror assembly of claim 4, wherein the controller is further configured to determine a proximity of the vehicle to a geographic area of interest; and wherein the control signal is generated to modify the orientation, the position, or a combination thereof and to direct a field of view of the movable sensor based on the geographic area of interest.

7. The vehicle mirror assembly of claim 4, wherein the controller is further configured to:
determine a navigation route for the vehicle; and
determine a sequence of fields of view of the movable sensor associated with respective locations on the navigation route,
wherein the control signal is generated based on the sequence of fields of view as the vehicle travels the navigation route.

8. The vehicle mirror assembly of claim 4, wherein the controller is further configured to:
capture sensor data via the movable sensor, another sensor of the vehicle, or a combination thereof;
analyze the sensor data to determine a safety risk to the vehicle; and
provide one or more signals for an operation of the vehicle based on the safety risk.

9. The vehicle mirror assembly of claim 1, wherein the vehicle mirror assembly is a side view mirror assembly.

10. The vehicle mirror assembly of claim 1, wherein the first material or the second material includes polymer-dispersed liquid-crystal devices in which liquid crystals are randomly dispersed into a polymer such that the polymer appears translucent or more opaque and then appears transparent when a voltage is applied to align the liquid crystals in the polymer.

11. The vehicle mirror assembly of claim 1, wherein the first material or the second material includes suspended-particle devices in which nano-particles are suspended in a liquid between or otherwise attached to glass or plastic such that when no voltage is applied the nano-particles are arranged randomly to block light and when voltage is applied the nano-particles align to let light pass to achieve transparency.

12. The vehicle mirror assembly of claim 1, wherein the refractive index of the first material or the second material changes based on voltage, heat, or light.

13. The vehicle mirror assembly of claim 1, wherein the second material is an electrochromic glass that changes its opacity in response to voltage.

14. A computer-implemented method of controlling a vehicle mirror assembly comprising:
determining a location of a vehicle, a location of an object of interest, navigation information, map information, an orientation of a reflective surface of the vehicle mirror assembly, or a combination thereof;
generating a control signal to modify an orientation, a position, or a combination thereof of a movable sensor of the vehicle mirror assembly based on the location of the vehicle, the location of the object of interest, the navigation information, the map information, the orientation of the reflective surface, or a combination thereof;
providing the control signal to an actuator assembly of the vehicle mirror assembly,
wherein the actuator assembly configured to modify the orientation, the position, or a combination thereof of a movable sensor based on the control signal, wherein modifying the orientation, the position, or the combination thereof of the movable sensor is independent from movement of the vehicle mirror assembly;
generating another control signal to activate a transparency of a portion of a housing, the reflective surface, or a combination thereof of the vehicle mirror assembly based on the location of the vehicle, the location of the object of interest, the navigation information, the map information, the orientation of the reflective surface, or a combination thereof; and
providing the another control signal to a transparency control element of the vehicle mirror assembly.

15. The method of claim 14, further comprising:
determining a proximity of the vehicle to a geographic area of interest,
wherein the control signal is generated to modify the orientation, the position, or a combination thereof and to direct a field of view of the movable sensor based on the geographic area of interest.

16. The method of claim 14, further comprising:
determining a navigation route for the vehicle; and
determining a sequence of fields of view of the movable sensor associated with respective locations on the navigation route,
wherein the control signal is generated based on the sequence of fields of view as the vehicle travels the navigation route.

17. The method of claim 14, further comprising:
capturing sensor data via the movable sensor, another sensor of the vehicle, or a combination thereof;
analyzing the sensor data to determine a safety risk to the vehicle; and
providing one or more signals for an operation of the vehicle based on the safety risk.

18. A non-transitory computer-readable storage medium for controlling a vehicle mirror assembly, carrying one or more sequences of one or more instructions which, when executed by one or more processors, cause an apparatus to perform:
determining a location of a vehicle, a location of an object of interest, navigation information, map information, an orientation of a reflective surface of the vehicle mirror assembly, or a combination thereof;
generating a control signal to modify an orientation, a position, or a combination thereof of a movable sensor of the vehicle mirror assembly based on the location of the vehicle, the location of the object of interest, the navigation information, the map information, the orientation of the reflective surface, or a combination thereof; and
providing the control signal to an actuator assembly of the vehicle mirror assembly,
wherein the actuator assembly configured to modify the orientation, the position, or a combination thereof of a movable sensor based on the control signal, wherein modifying the orientation, the position, or the combination thereof of the movable sensor is independent from movement of the vehicle mirror assembly;
generating another control signal to activate a transparency of a portion of a housing, the reflective surface, or a combination thereof of the vehicle mirror assembly based on the location of the vehicle, the location of the object of interest, the navigation information, the map information, the orientation of the reflective surface, or a combination thereof; and
providing the another control signal to a transparency control element of the vehicle mirror assembly.

19. The non-transitory computer-readable storage medium of claim 18, wherein the apparatus is caused to further perform:
determining a proximity of the vehicle to a geographic area of interest, wherein the control signal is generated to modify the orientation, the position, or a combination thereof and to direct a field of view of the movable sensor based on the geographic area of interest.

* * * * *